US010764255B2

(12) United States Patent
Asenjo et al.

(10) Patent No.: US 10,764,255 B2
(45) Date of Patent: Sep. 1, 2020

(54) SECURE COMMAND EXECUTION FROM A CLOUD MONITORING SYSTEM TO A REMOTE CLOUD AGENT

(71) Applicant: Rockwell Automation Technologies, Inc., Mayfield Heights, OH (US)

(72) Inventors: Juan L. Asenjo, Timberlake, OH (US); Francisco Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 44 days.

(21) Appl. No.: 15/271,752

(22) Filed: Sep. 21, 2016

(65) Prior Publication Data

US 2018/0083982 A1   Mar. 22, 2018

(51) Int. Cl.
*H04L 29/06* (2006.01)
*H04L 29/08* (2006.01)
(52) U.S. Cl.
CPC .......... *H04L 63/0428* (2013.01); *H04L 63/10* (2013.01); *H04L 63/20* (2013.01); *H04L 67/12* (2013.01)
(58) Field of Classification Search
CPC .................................................. H04L 63/123
(Continued)

(56) References Cited

U.S. PATENT DOCUMENTS 5,159,685 A    10/1992 Kung
5,519,605 A    5/1996 Cawlfield
(Continued)

FOREIGN PATENT DOCUMENTS

CN    1755564    4/2006
CN    1937559    3/2007
(Continued)

OTHER PUBLICATIONS

Peng et al., "Malware detection method for the industrial control systems," 2016 4th International Conference on Cloud Computing and Intelligence Systems (CCIS) Year: 2016 | Conference Paper | Publisher: IEEE.*
(Continued)

*Primary Examiner* — Roderick Tolentino
(74) *Attorney, Agent, or Firm* — Amin, Turocy & Watson, LLP

(57) ABSTRACT

An industrial control system that includes a cloud platform facilitates secure execution of command data for an industrial device in communication with the cloud platform. The system includes an interface component, a validation component and an execution component. The interface component transmits industrial data associated with an industrial device to the cloud platform that analyzes the industrial data. The interface component also receives, from the cloud platform, command data for the industrial device that is generated based on the industrial data. The validation component validates the command data received from the cloud platform based on execution data indicative of a set of conditions for the command data. The validation component also establishes a secure communication link with the industrial device in response to a determination that the command data is approved for execution on the industrial device. The execution component initiates execution of the command data via the industrial device.

19 Claims, 15 Drawing Sheets

(58) Field of Classification Search
USPC .................................................... 726/2–10
See application file for complete search history.

(56) References Cited

U.S. PATENT DOCUMENTS

| | | |
|---|---|---|
| 6,230,010 B1 | 5/2001 | Morris |
| 6,609,034 B1 | 8/2003 | Behrens et al. |
| 6,640,241 B1 | 10/2003 | Ozzie et al. |
| 6,675,226 B1 | 1/2004 | Nair et al. |
| 7,133,908 B1 | 11/2006 | Pajak et al. |
| 7,159,209 B1 | 1/2007 | Srinivasan et al. |
| RE39,989 E | 1/2008 | Morris |
| 7,676,287 B2 | 3/2010 | Eryurek et al. |
| 8,219,216 B2 | 7/2012 | Klug et al. |
| 8,275,847 B2 | 9/2012 | Lewis |
| 8,618,941 B2 | 12/2013 | Javey et al. |
| 8,649,500 B1 | 2/2014 | Cohen et al. |
| 8,667,589 B1* | 3/2014 | Saprygin ............ H04L 63/0209 726/23 |
| 8,694,770 B1* | 4/2014 | Osburn, III ......... G05B 19/042 713/153 |
| 9,438,648 B2 | 9/2016 | Asenjo et al. |
| 9,489,832 B2 | 11/2016 | Nair et al. |
| 9,552,143 B2 | 1/2017 | Javey et al. |
| 9,928,724 B2 | 3/2018 | Alcorn et al. |
| 9,954,972 B2 | 4/2018 | Asenjo et al. |
| 10,229,579 B2 | 3/2019 | Alcorn et al. |
| 2001/0053992 A1 | 12/2001 | Eto et al. |
| 2002/0116635 A1* | 8/2002 | Sheymov ............ G06F 9/45533 726/24 |
| 2002/0133270 A1 | 9/2002 | Hung et al. |
| 2002/0178159 A1 | 11/2002 | O'Brien |
| 2003/0014387 A1 | 1/2003 | Kreidler et al. |
| 2003/0033237 A1 | 2/2003 | Bawri |
| 2003/0083754 A1 | 5/2003 | Tripathi et al. |
| 2003/0212818 A1 | 11/2003 | Klein et al. |
| 2004/0141517 A1 | 7/2004 | Balasubramanian et al. |
| 2004/0230859 A1 | 11/2004 | Cochran et al. |
| 2005/0010333 A1 | 1/2005 | Lorton et al. |
| 2005/0154477 A1 | 7/2005 | Martin et al. |
| 2005/0159890 A1 | 7/2005 | Humphries et al. |
| 2005/0193285 A1 | 9/2005 | Jeon |
| 2005/0281263 A1 | 12/2005 | Miyamoto et al. |
| 2006/0068762 A1 | 3/2006 | Baldwin et al. |
| 2006/0174707 A1 | 8/2006 | Zhang |
| 2006/0294047 A1 | 12/2006 | Johnston et al. |
| 2007/0019641 A1 | 1/2007 | Pai et al. |
| 2008/0027704 A1 | 1/2008 | Kephart et al. |
| 2008/0168092 A1 | 7/2008 | Boggs et al. |
| 2008/0317058 A1 | 12/2008 | Williams |
| 2009/0052409 A1 | 2/2009 | Chen et al. |
| 2009/0089227 A1 | 4/2009 | Sturrock et al. |
| 2009/0172637 A1 | 7/2009 | Parikh |
| 2009/0183201 A1 | 7/2009 | Dasgupta |
| 2009/0198350 A1 | 8/2009 | Thiele |
| 2009/0265036 A1 | 10/2009 | Jamieson et al. |
| 2009/0326892 A1 | 12/2009 | Lin |
| 2010/0070852 A1 | 3/2010 | Li |
| 2010/0205021 A1 | 8/2010 | Jewett et al. |
| 2010/0256794 A1 | 10/2010 | McLaughlin et al. |
| 2010/0256795 A1 | 10/2010 | McLaughlin et al. |
| 2010/0257228 A1 | 10/2010 | Staggs et al. |
| 2010/0289652 A1 | 11/2010 | Javey et al. |
| 2010/0318392 A1 | 12/2010 | Cassels et al. |
| 2011/0060907 A1 | 3/2011 | Hartmann et al. |
| 2011/0066298 A1 | 3/2011 | Francino |
| 2011/0103393 A1 | 5/2011 | Meier et al. |
| 2011/0134930 A1 | 6/2011 | McLaren et al. |
| 2011/0145836 A1 | 6/2011 | Wheeler et al. |
| 2011/0264622 A1 | 10/2011 | Vargas et al. |
| 2012/0143378 A1 | 6/2012 | Spears et al. |
| 2012/0144202 A1 | 6/2012 | Counterman |
| 2012/0166963 A1 | 6/2012 | Kohli et al. |
| 2012/0232869 A1 | 9/2012 | Maturana et al. |
| 2012/0237016 A1 | 9/2012 | Hegde et al. |
| 2012/0304247 A1 | 11/2012 | Badger et al. |
| 2012/0331104 A1 | 12/2012 | Akiyama et al. |
| 2013/0067090 A1 | 3/2013 | Batrouni et al. |
| 2013/0081146 A1 | 3/2013 | Hakozaki |
| 2013/0110298 A1 | 5/2013 | Beveridge |
| 2013/0123965 A1 | 5/2013 | Cooper et al. |
| 2013/0124253 A1 | 5/2013 | Cooper et al. |
| 2013/0150986 A1 | 6/2013 | Timsjo et al. |
| 2013/0191106 A1 | 7/2013 | Kephart et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0225151 A1 | 8/2013 | King et al. |
| 2013/0227446 A1 | 8/2013 | Zala et al. |
| 2013/0262678 A1 | 10/2013 | Tung et al. |
| 2013/0266193 A1 | 10/2013 | Tiwari et al. |
| 2013/0269020 A1 | 10/2013 | Griffin et al. |
| 2013/0283151 A1 | 10/2013 | Deguzman et al. |
| 2013/0290952 A1 | 10/2013 | Childers, Jr. |
| 2014/0047107 A1 | 2/2014 | Maturana et al. |
| 2014/0147064 A1 | 2/2014 | Maturana et al. |
| 2014/0115592 A1 | 4/2014 | Frean et al. |
| 2014/0156234 A1 | 6/2014 | Maturana et al. |
| 2014/0157368 A1* | 6/2014 | Shah ................ G06F 21/44 726/4 |
| 2014/0164124 A1 | 6/2014 | Rhoads |
| 2014/0207868 A1 | 7/2014 | Gordon et al. |
| 2014/0245208 A1 | 8/2014 | Javey et al. |
| 2014/0257528 A1 | 9/2014 | Perez et al. |
| 2014/0269531 A1 | 9/2014 | Luna et al. |
| 2014/0274005 A1 | 9/2014 | Luna et al. |
| 2014/0277905 A1 | 9/2014 | Anderson |
| 2014/0280796 A1 | 9/2014 | Pijewski |
| 2014/0282015 A1 | 9/2014 | Nixon et al. |
| 2014/0336785 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0337429 A1 | 11/2014 | Asenjo et al. |
| 2014/0337473 A1 | 11/2014 | Frusina et al. |
| 2015/0113627 A1 | 4/2015 | Curtis et al. |
| 2015/0120821 A1 | 4/2015 | Bendell |
| 2015/0135260 A1* | 5/2015 | Ilyadis ................ H04L 41/042 726/1 |
| 2015/0220080 A1 | 8/2015 | Nixon et al. |
| 2015/0277406 A1 | 10/2015 | Maturana et al. |
| 2015/0281319 A1 | 10/2015 | Maturana et al. |
| 2015/0281355 A1 | 10/2015 | Maturana et al. |
| 2015/0281453 A1 | 10/2015 | Maturana et al. |
| 2015/0287318 A1 | 10/2015 | Nair et al. |
| 2015/0316904 A1 | 11/2015 | Govindaraj et al. |
| 2015/0324502 A1 | 11/2015 | Eberhardt |
| 2015/0363902 A1 | 12/2015 | Wada et al. |
| 2015/0381744 A1 | 12/2015 | Na |
| 2016/0023351 A1* | 1/2016 | Kuffner ................ B25J 9/0084 700/248 |
| 2016/0041565 A1 | 2/2016 | Edwards |
| 2016/0112283 A1 | 4/2016 | Maturana et al. |
| 2016/0125487 A1 | 5/2016 | Hamby |
| 2016/0142396 A1* | 5/2016 | McRoberts ............ G06F 21/32 726/7 |
| 2016/0163179 A1 | 6/2016 | Matsumoto et al. |
| 2016/0179993 A1 | 6/2016 | Maturana et al. |
| 2016/0182309 A1 | 6/2016 | Maturana et al. |
| 2016/0256775 A1* | 9/2016 | Gustafson ............ A63F 13/30 |
| 2016/0282859 A1* | 9/2016 | Wilber ............ G05B 19/41875 |
| 2016/0335875 A1 | 11/2016 | Alcorn et al. |
| 2016/0349140 A1 | 12/2016 | Teymouri |
| 2016/0350093 A1 | 12/2016 | Walker et al. |
| 2017/0102693 A1 | 4/2017 | Kidd et al. |
| 2017/0102694 A1 | 4/2017 | Enver et al. |
| 2017/0129512 A1 | 5/2017 | Shubs, Jr. et al. |
| 2017/0212562 A1* | 7/2017 | Wang ................ G06F 1/206 |
| 2017/0238072 A1 | 8/2017 | Mackie et al. |
| 2018/0033087 A1 | 2/2018 | Delinselle et al. |
| 2018/0034913 A1* | 2/2018 | Matthieu ................ H04W 8/22 |
| 2018/0182228 A1 | 6/2018 | Alcorn et al. |
| 2018/0300639 A1 | 10/2018 | Abbas |

(56) References Cited

U.S. PATENT DOCUMENTS

| | | | |
|---|---|---|---|
| 2018/0356780 | A1 | 12/2018 | Halabieh |
| 2018/0367560 | A1 | 12/2018 | Mahaffey et al. |
| 2019/0049332 | A1 | 2/2019 | Shamir et al. |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |
| EP | 2 924 571 A2 | 9/2015 |
| WO | 01/15001 A2 | 3/2001 |

OTHER PUBLICATIONS

Ray et al., "Future research challenges of secure heterogeneous industrial communication networks," 2016 IEEE 21st International Conference on Emerging Technologies and Factory Automation (ETFA) Year: 2016 | Conference Paper | Publisher: IEEE.*
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action for U.S. Appl. No. 14/634,174, dated Aug. 4, 2016, 11 pages.
Steiner, J. G., et al., "Kerberos: An Authentication Service for Open Network Systems," Proceedings of the Winter Usenix Conference, Feb. 9, 1988, pp. 191-202.
Office Action from U.S. Appl. No. 14/525,144, dated Sep. 9, 2016, 28 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Office Action for U.S. Appl. No. 14/639,279 dated Nov. 15, 2017, 75 pages.
Office Action for U.S. Appl. No. 14/562,233 dated Dec. 29, 2017, 36 pages.
Office Action for Chinese Application Serial No. 201510138371.0 dated Nov. 14, 2017, 5 pages.
Office Action for U.S. Appl. No. 15/431,128 dated Oct. 18, 2017, 37 pages.
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Chinese Office Action and English Translation thereof dated Jul. 12, 2017, for Chinese Application Serial No. 201510138210.1, 14 pages.
Final Office Action for U.S. Appl. No. 14/562,233, dated Jul. 28, 2017, 33 pages.
Final Office Action for U.S. Appl. No. 14/639,279, dated Aug. 9, 2017, 66 pages.
Office Action for U.S. Appl. No. 14/525,149 dated Oct. 5, 2017, 88 pages.
Final Office Action received for U.S. Appl. No. 14/562,233 dated Jun. 15, 2018, 35 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.
European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Extended European Search Report received for EP Patent Application Serial No. 18182852.6 dated Nov. 22, 2018, 7 pages.
Communication Pursuant to Rule 69 EPC received for EP Patent Application Serial No. 18182852.6 dated Jan. 21, 2019, 2 pages.
Notice of Allowance received for U.S. Appl. No. 15/795,512 dated Feb. 6, 2019, 105 pages.
Extended European Search Report received for EP Patent Application Serial No. 18187973.5 dated Dec. 14, 2018, 6 pages.
Non-Final Office Action received for U.S. Appl. No. 15/676,337 dated Mar. 6, 2019, 74 pages.

(56) References Cited

OTHER PUBLICATIONS

Communication Pursuant to Rule 69 EPC received for EP Patent Application Serial No. 18187973.5 dated Feb. 25, 2019, 2 pages.
Non-Final Office Action received for U.S. Appl. No. 15/692,213 dated Apr. 5, 2019, 64 pages.
Extended European Search Report received for EP Patent Application Serial No. 18191111.6 dated Feb. 12, 2019, 12 pages.
Communication Pursuant to Rule 69 EPC received for EP Patent Application Serial No. 18191111.6 dated Mar. 18, 2019, 2 pages.
Non-Final Office Action received for U.S. Appl. No. 15/966,546 dated May 10, 2019, 58 pages.
Notice of Allowance received for U.S. Appl. No. 15/676,337 dated Jul. 9, 2019, 37 pages.
Non-Final Office Action received for U.S. Appl. No. 15/646,689 dated Oct. 10, 2019, 89 pages.
Final Office Action received for U.S. Appl. No. 15/646,689 dated Feb. 26, 2020, 44 pages.
Non-Final Office Action received for U.S. Appl. No. 15/646,689 dated Jun. 23, 2020, 46 pages.
Notice of Allowance received for U.S. Appl. No. 16/592,376 dated Jun. 15, 2020, 73 pages.
Communication Pursuant to Article 94(3) EPC received for EP Patent Application Serial No. 18182852.6 dated May 18, 2020, 7 pages.

* cited by examiner

US 10,764,255 B2

SECURE COMMAND EXECUTION FROM A CLOUD MONITORING SYSTEM TO A REMOTE CLOUD AGENT

BACKGROUND

The subject matter disclosed herein relates generally to industrial control systems, and, more particularly, to controlling an industrial device in communication with a cloud monitoring system.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes an interface component, a validation component and an execution component. The interface component transmits industrial data associated with an industrial device to a cloud service system that analyzes the industrial data. The interface component also receives, from the cloud service system, command data for the industrial device that is generated based on the industrial data. The validation component validates the command data received from the cloud service system based on execution data indicative of a set of conditions for the command data. The validation component also establishes a secure communication link with the industrial device in response to a determination that the command data is approved for execution on the industrial device. The execution component transmits the command data to the industrial device via the secure communication link. The execution component also initiates execution of the command data via the industrial device.

Additionally, one or more embodiments provide a method for transmitting, by a cloud agent device comprising a processor, industrial data associated with an industrial device to a cloud platform system. The method also includes receiving, by the cloud agent device, command data for the industrial device, where the command data is received from the cloud platform system. Also, the method includes validating, by the cloud agent device, the command data received from the cloud platform system based on execution data indicative of a set of security criteria for the command data. Moreover, the method includes establishing, by the cloud agent device, a communication channel with the industrial device in response to a determination that the command data satisfies the set of security criteria for the command data, and initiating, by the cloud agent device, execution of the command data on the industrial device.

In addition, according to one or more embodiments, a non-transitory computer-readable medium is provided having stored thereon instructions that, in response to execution, cause a system to perform operations, the operations comprising sending industrial data associated with an industrial device to a cloud platform system, receiving, from the cloud platform system, command data for the industrial device, validating the command data received from the cloud platform system based on a set of security requirements for the command data, and initiating execution of the command data on the industrial device in response to a determination that the command data satisfies a defined criterion associated with the set of security requirements.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
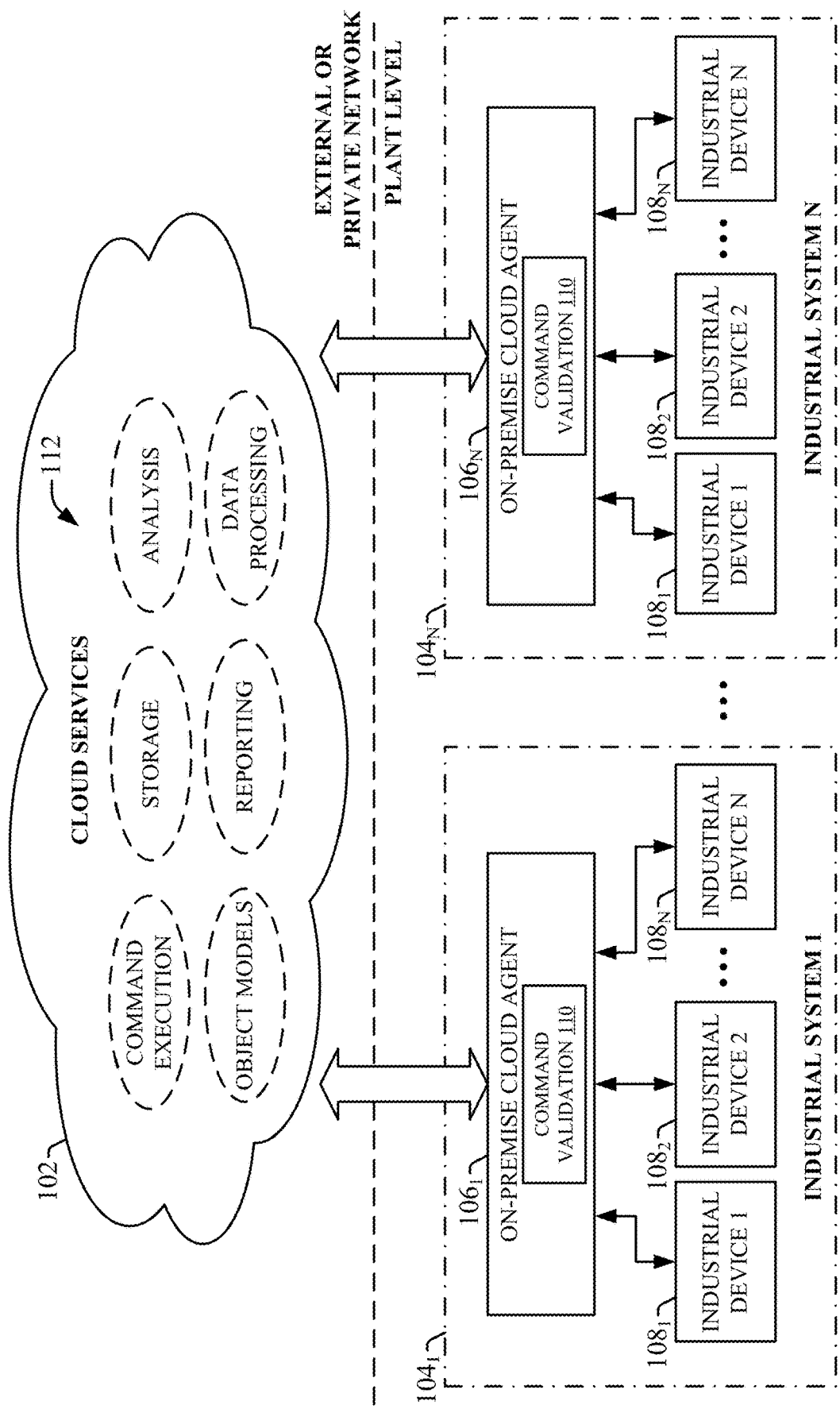
FIG. 1 is a block diagram depicting an example high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

In general, operators wish to operate industrial controllers to meet criteria of industrial systems associated with the industrial controllers, while also maximizing efficiency and/or performance of the industrial systems. To achieve this, a group of support personnel with knowledge about a particular industrial system can visually monitor industrial data associated with an industrial system such as alarms, sensor data, etc. in order to make decisions based on their knowledge of the industrial system. However, it is generally difficult to maximize efficiency and/or performance of an industrial system based on human analysis of industrial data.

In order to simplify the process of determining command data (e.g., set point parameters, operating commands, open/close commands, operating parameter values, etc.) for an industrial device and/or to maximize efficiency and/or performance of an industrial system, one or more embodiments of the present disclosure provide an industrial control system that includes a cloud platform and facilitates secure execution of command data generated by the cloud platform. The command data can be executed by an industrial system and/or one or more industrial devices in communication with the cloud platform. The cloud-based industrial control system automatically identifies suitable command data for a given industrial system application by leveraging cloud-side analytics and an industrial system behavioral model generated based on industrial data collected and maintained on cloud storage (e.g., big data storage). The industrial system behavioral model creates a virtual determination of maximum efficiency and/or maximum performance associated with a set of industrial devices in an industrial system application based on industrial data collected for the industrial control system. To this end, the cloud-based industrial control system monitors industrial data (e.g., process variables, other operational data, etc.) and incrementally builds a high-fidelity model of the industrial system over time as new industrial data is collected into the cloud. The industrial control system can apply iterative analytics to the model until command data for the set of industrial devices are converged upon that satisfy a defined optimization criterion (e.g., maximum efficiency, maximum performance, etc.), and provide the calculated command data to a cloud agent associated with the set of industrial devices. The cloud agent can verify the command data before allowing the command data to be executed by the set of industrial devices. For example, the industrial system and/or the cloud agent located remotely from the cloud platform can maintain a security manifest for the industrial system. The security manifest can be an encrypted document that resides at the industrial system and/or the cloud agent located remotely from the cloud platform. The security manifest can also include a set of security validation requirements for the command data provided by the cloud platform. Once the command data is validated, the command data can be forwarded to a controller (e.g., a plant master control system) and/or the set of industrial devices on a plant floor of the industrial system. Thus, the industrial control system described herein mitigates the need to manually determine command data and/or manually execute command data using trial-and-error methods by leveraging big data analysis and machine modeling in the cloud platform to automatically generate and/or validate suitable command data for a given industrial control application.

To illustrate an example cloud architecture that can be used to provide cloud-based boiler control services, an example high-level overview of an industrial enterprise (e.g., one or more boiler systems) that leverages cloud-based services is now described in connection with FIG. 1. The industrial enterprise comprises one or more industrial systems $104_{1-N}$, each having one or more industrial devices $108_{1-N}$. The industrial devices $108_{1-N}$ can be associated with and/or can operate within the respective industrial systems $104_{1-N}$. Industrial devices $108_{1-N}$ can include such devices as field devices such as sensors (e.g., analog sensors, digital sensors, etc.), meters and/or alarms; industrial controllers (e.g., programmable logic controllers or other types of programmable automation controllers); operator interfaces (e.g., human-machine interfaces, industrial monitors, graphic terminals, message displays, etc.); vision system devices (e.g., vision cameras); manufacturing tools; industrial machines; automated industrial devices; or other such industrial devices.

An example industrial system can include one or more industrial automation systems that facilitate monitoring and control of respective industrial processes. Controllers in the one or more industrial systems $104_{1-N}$ can exchange data with the industrial devices $108_{1-N}$ using native hardwired I/O or via a plant network such as EtherNet/IP, Data Highway Plus, ControlNet, Devicenet, or the like. A given controller typically receives any combination of digital or analog signals from the industrial devices $108_{1-N}$ indicating a current state of the devices and their associated processes (e.g., temperature, pressure, speed, fluid level, etc.), and executes a user-defined control program that performs automated decision-making for the controlled processes based on the received signals. The controller then outputs appropriate digital and/or analog control signaling to the industrial devices $108_{1-N}$ in accordance with the decisions made by the control program. These outputs can include device actuation signals, temperature or pressure control signals, operational commands, process commands, and the like. The control program can comprise any suitable type of code used to process input signals read into the controller and to control output signals generated by the controller, including but not limited to ladder logic, sequential function charts, function block diagrams, structured text, or other such platforms.

According to one or more embodiments, on-premise cloud agents 106 can collect data from industrial devices $108_{1-N}$—or from other data sources, including but not limited to data historians, business-level systems, etc.—and send this data to cloud platform 102 for processing and storage. Cloud platform 102 can be any infrastructure that allows cloud services 112 (such as the cloud-based industrial control system described herein) to be accessed and utilized by cloud-capable devices. Cloud platform 102 can be a public cloud accessible via the Internet by devices having Internet connectivity and appropriate authorizations to utilize the cloud services 112. In some scenarios, cloud platform 102 can be provided by a cloud provider as a platform-as-a-service (PaaS), and the cloud services 112 can reside and execute on the cloud platform 102 as a cloud-based service. In some such configurations, access to the cloud platform 102 and the cloud services 112 can be provided to customers as a subscription service by an owner of the cloud services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices $108_{1-N}$ based on analysis of real-time system data or other factors), command execution (e.g., secure fail safe command execution provided to industrial devices $108_{1-N}$ based on analysis of real-time system data or other factors), visualization applications such as the cloud-based operator interface system described herein, reporting applications, Enterprise Resource Planning (ERP) applications, notification services, or other such applications. Cloud-based data analytics can include embodiments of the industrial control system described herein. Cloud platform 102 may also include one or more object models to facilitate data ingestion and processing in the cloud. If cloud platform 102 is a web-based cloud, cloud agents 106 at the respective industrial systems 104 may interact with cloud services 112 directly or via the Internet. In an exemplary configuration, the industrial devices $108_{1-N}$ connect to the on-premise cloud agents 106 through a physical or wireless local area network or radio link. In another exemplary configuration, the industrial devices $108_{1-N}$ may access the cloud platform 102 directly using integrated cloud agents. Cloud agents and their associated data collection and processing services are discussed in more detail below.

Ingestion of industrial device data in the cloud platform 102 through the use of cloud agents 106 can offer a number of advantages particular to industrial control systems. For one, cloud-based storage offered by the cloud platform 102 can be easily scaled to accommodate the large quantities of data generated daily by an industrial enterprise (e.g., one or more industrial systems). Moreover, multiple industrial devices and/or multiple industrial device systems can migrate respective industrial data and/or demand data to the cloud for aggregation, collation, collective analysis, visualization, and reporting. Cloud agents 106 can be configured to automatically detect and communicate with the cloud platform 102 upon installation associated with any industrial system, simplifying integration with existing cloud-based data storage, analysis, or reporting applications for an industrial system. In another example application, cloud-based diagnostic applications can monitor the health of respective industrial systems or their associated industrial devices across an entire plant, or across multiple industrial facilities that make up an enterprise. Cloud-based industrial control applications can be used to track industrial device efficiency and/or capacity throughout a period of operation. Moreover, cloud based control applications can perform remote decision-making for a controlled industrial system based on data collected in the cloud from the industrial system, and issue control commands to the system via the cloud agent. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

The cloud platform 102 in combination with command validation 110 of the respective on-premise cloud agents $106_{1-N}$ can also facilitate safe interaction between the cloud platform 102 and the industrial systems $104_{1-N}$ (e.g., respective on-premise cloud agents $106_{1-N}$ and/or industrial devices $108_{1-N}$ of the industrial systems $104_{1-N}$). Therefore, the cloud platform 102 can allow software vendors to provide a 'cloud closed loop' service to their customers. In an aspect, the cloud platform 102 can send one or more commands (e.g., one or more digital commands and/or one or more analog commands) to the industrial systems $104_{1-N}$. For example, cloud platform 102 can send one or more commands (e.g., one or more digital commands and/or one or more analog commands) to respective on-premise cloud agents $106_{1-N}$ and/or industrial devices $108_{1-N}$. The cloud platform 102 in combination with the command validation 110 can provide a security mechanism (e.g., a fail safe secure mechanism, a handshake mechanism) to send the one or more commands to the industrial systems $104_{1-N}$ (e.g., respective on-premise cloud agents $106_{1-N}$ and/or industrial devices $108_{1-N}$). Additionally or alternatively, the cloud platform 102 can receive one or more commands (e.g., one or more digital commands and/or one or more analog commands) from the industrial systems $104_{1-N}$. For example, cloud platform 102 can also receive one or more commands (e.g., one or more digital commands and/or one or more analog commands) from respective on-premise cloud agents $106_{1-N}$ and/or industrial devices $108_{1-N}$. Therefore, the safety mechanism provided by the cloud platform 102 and the command validation 110 can additionally or alternatively allow the cloud platform to receive the one or more commands from the industrial systems $104_{1-N}$ (e.g., respective on-premise cloud agents $106_{1-N}$ and/or industrial devices $108_{1-N}$).

Figure 2:
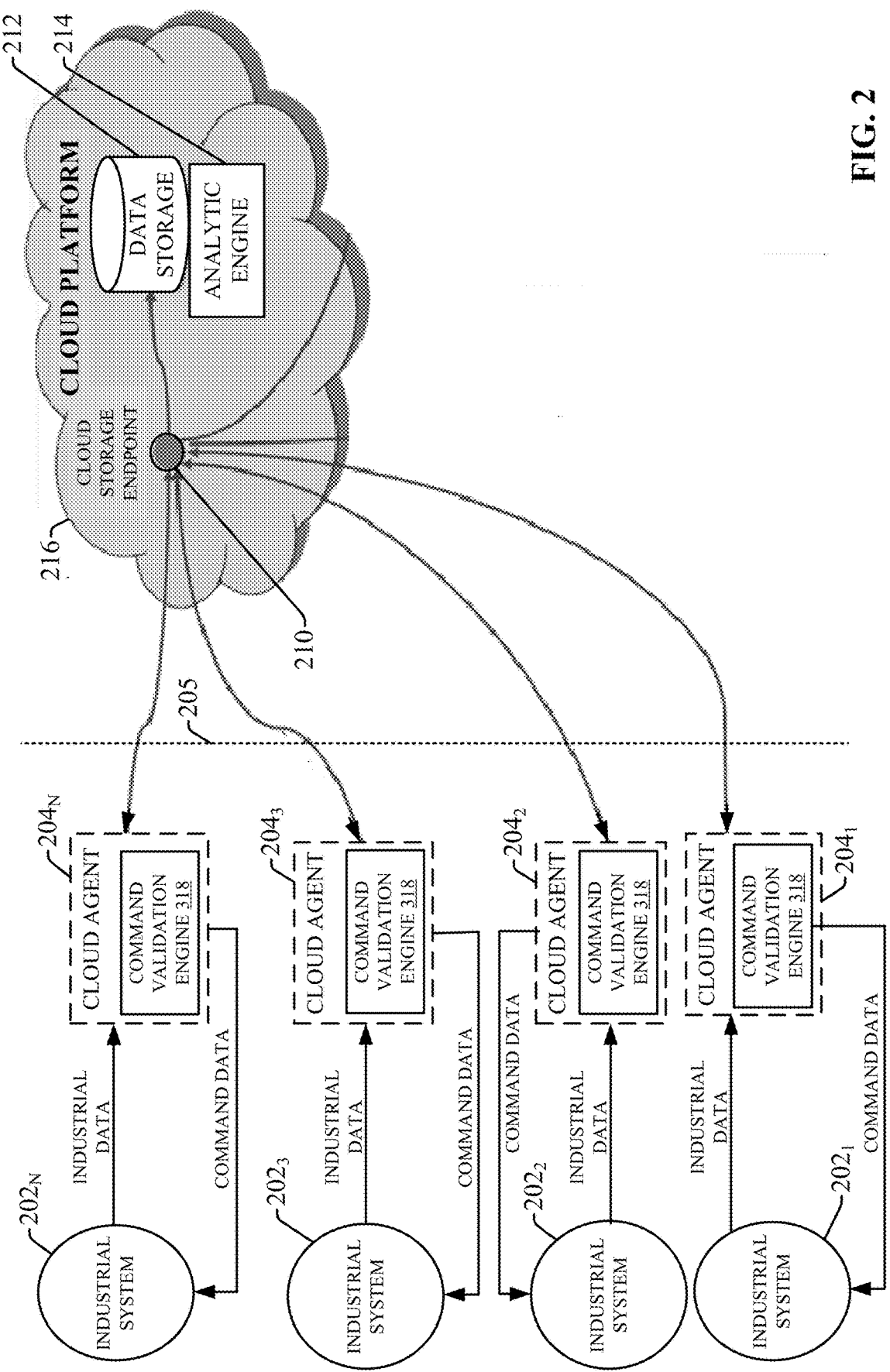
FIG. 2 illustrates an example architecture that uses cloud-based analytics to control industrial operation.

FIG. 2 illustrates an example architecture that uses cloud-based analytics to control industrial device operation for an example industrial system. The example architecture illustrated in FIG. 2 can also provide validation of commands generated by the cloud-based analytics for control of industrial device operation. In this example system, cloud agents $204_{1-N}$ (e.g., on-premise cloud agents) are deployed at the remote customer site and used to collect industrial data (e.g., industrial device data, operational data, configuration data, sensor data, etc.) associated with the industrial systems $202_{1-N}$. A particular industrial system $202_{1-N}$ can correspond to a particular industrial system $104_{1-N}$. For example, each of the industrial systems $202_{1-N}$ can include one or more industrial devices such as industrial devices $208_{1-N}$. In one example, the industrial data can be time-series data (e.g., time-series sensor data, etc.).

The cloud agents $204_{1-N}$ can collect and/or determine the industrial data by monitoring the one or more industrial devices $208_{1-N}$ included in the industrial systems $202_{1-N}$. For example, the cloud agents $204_{1-N}$ can collect the industrial data by monitoring analog tags associated with industrial device(s) included in the industrial systems $202_{1-N}$. Analog tags can contain near real-time operational information for the industrial device(s) included in the industrial systems $202_{1-N}$ and/or can indicate alarm statuses. In an non-limiting example of a five industrial device system, this may entail collecting data from approximately 200 analog tags and 700 alarm tags, resulting in collection of approximately 30 Gb of data per month. The cloud agents $204_{1-N}$ can also collect and/or determine demand data associated with the industrial systems $202_{1-N}$.

The cloud agents $204_{1-N}$ can process the industrial data for transmission to a cloud platform 216. The cloud agents $204_{1-N}$ can push the industrial data to the cloud platform 216 via cloud storage endpoint 210 for storage on cloud-based data storage 212. In an aspect, the cloud agents 204 can convert the industrial data into a communication format (e.g., a HTTPS format, a SSL format, etc.). In another aspect, a firewall 205 can be implemented between the cloud agents $204_{1-N}$ and the cloud platform 216. Analytic engine 214 can analyze the industrial data in view of one or more operational rules to calculate efficiency curves for each industrial device in the industrial systems $202_{1-N}$. The analytic engine 214 can also determine command data for each industrial device in the industrial systems $202_{1-N}$. The command data can control at least a portion of one or more processes associated with an industrial device in the industrial systems $202_{1-N}$. In a non-limiting example, the command data can include one or more set point parameters, one or more operating commands, one or more open/close commands, one or more operating parameter values and/or other command data for an industrial device in industrial systems $202_{1-N}$.

The command data can be securely transmitted to the cloud agents $204_{1-N}$. Furthermore, the cloud agents $204_{1-N}$ can validate the command data before further transmitting (e.g., forwarding) the command data to the industrial systems $206_{1-N}$. The cloud agents $204_{1-N}$ can each include command validation engine 218 to facilitate validation of the command data. The command validation engine 218 can be a fail safe mechanism to facilitate a secure closed-loop between the cloud agents $204_{1-N}$ and the cloud platform 216

Figure 3:
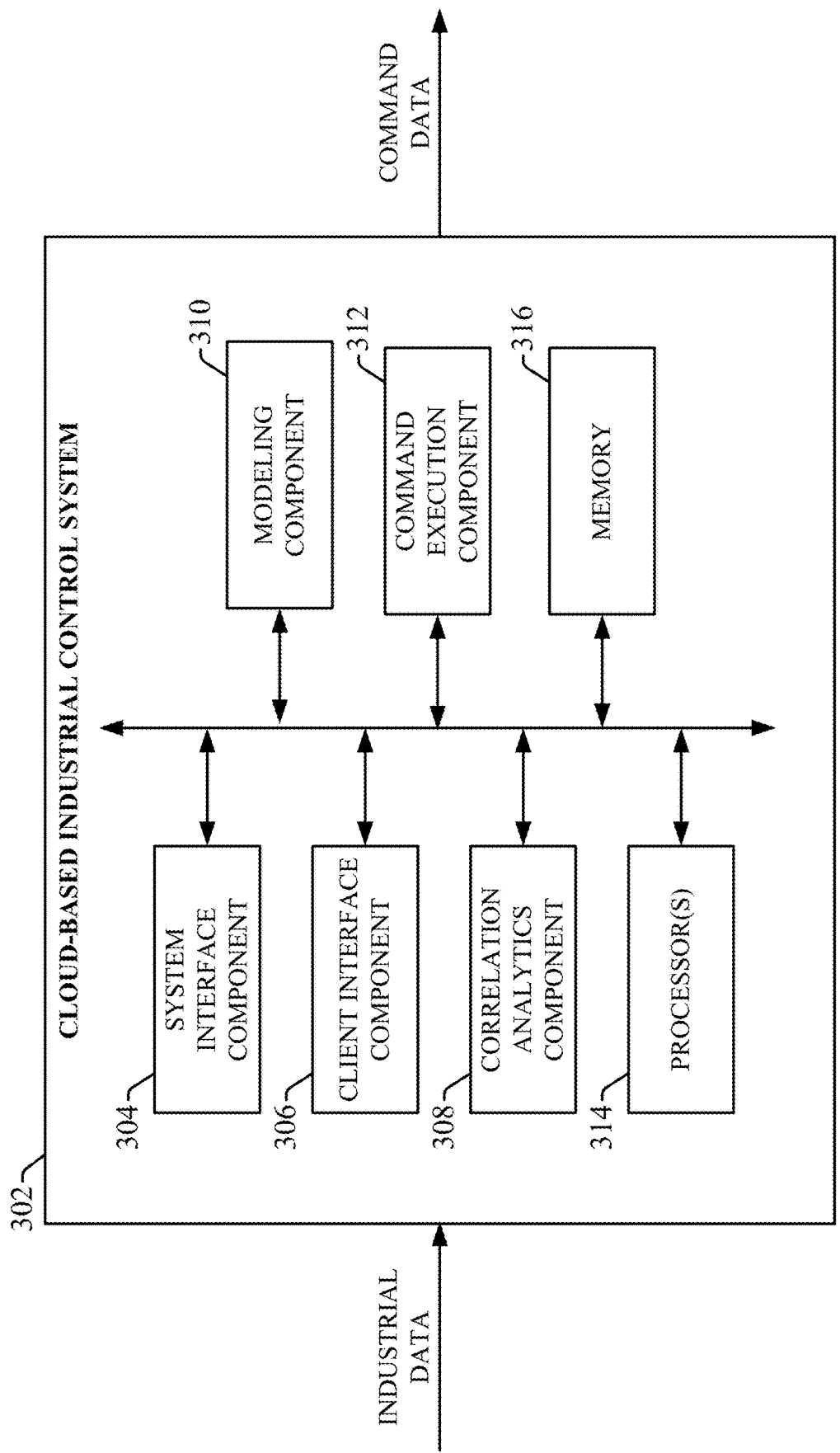
FIG. 3 is a block diagram of an example cloud-based boiler control system.

FIG. 3 is a block diagram of an example cloud-based industrial control system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In an aspect, the cloud-based industrial control system 302 can be associated with a cloud platform (e.g., the cloud platform 102 and/or the cloud platform 216).

Cloud-based industrial control system 302 can include a system interface component 304, a client interface component 306, a correlation analytics component 308, a modeling component 310 and/or a command execution component 312. The cloud-based industrial control system 302 can also include one or more processors 314 and memory 316. In various embodiments, one or more of the system interface component 304, the client interface component 306, the correlation analytics component 308, the modeling component 310, the command execution component 312, the one or more processors 314, and memory 316 can be electrically and/or communicatively coupled to one another to perform one or more of the functions of the cloud-based industrial control system 302. In some embodiments, components 304, 306, 308, 310 and 312 can comprise software instructions stored on memory 316 and executed by processor(s) 314. Cloud-based industrial control system 302 may also interact with other hardware and/or software components not depicted in FIG. 3. For example, processor(s) 314 may interact with one or more external user interface devices, such as a keyboard, a mouse, a display monitor, a touchscreen, or other such interface devices.

System interface component 304 can be configured to receive industrial data from one or more industrial assets comprising an industrial automation system (e.g., an industrial control system). For example, the system interface component 304 can collect industrial data associated with the industrial systems $202_{1-N}$ and/or the cloud agents $204_{1-N}$. The system interface component 304 can also store the industrial data on a cloud platform (e.g., the cloud platform 102, the cloud platform 216, etc.). The industrial data can be received directly from one or more cloud-capable industrial devices having integrated cloud interface capabilities (e.g., industrial devices $208_{1-N}$, etc.) or via a cloud agent device (e.g., on-premise cloud agents 106, cloud agents $204_{1-N}$, etc.) that collects data from one or more industrial assets and ingests the collected data to the cloud platform for storage and processing by the cloud-based industrial control system 302. In an aspect, the system interface component 304 can generate one or more data sets based on the industrial data. In another aspect, the system interface component 304 can receive at least a portion of the industrial data as a data packet from a cloud agent device associated with one or more industrial systems.

Client interface component 306 can be configured to exchange data with a client device to facilitate user interaction with the cloud-based industrial control system 302. The client device can be communicatively connected to a cloud platform (e.g., the cloud platform 102, the cloud platform 216, etc.) associated with the cloud-based industrial control system 302. Furthermore, the client device can include, but is not limited to, a desktop computer, a laptop computer, a tablet computer, a smartphone, or another type of user device. Data exchanged with the client device via client interface component 306 can include, but is not limited to, a command from the client device to initiate industrial device analysis for a given industrial system, information associated with which industrial devices and/or industrial systems to operate, a dashboard, user interface screens served to the client device by the cloud-based industrial control system 302, or other such information.

Correlation analytics component 308 can be configured to determine and/or generate command data for an industrial system (e.g., an industrial system from industrial systems $104_{1-N}$ or industrial systems $202_{1-N}$) and/or an industrial device (e.g., an industrial device from industrial devices $108_{1-N}$) based on analysis of the industrial data. In some embodiments, correlation analytics component 308 can perform an iterative analysis of an industrial system behavioral model that links efficiency and capacity associated with industrial devices to yield suitable set point parameters for the industrial devices. Additionally or alternatively, the correlation analytics component 308 can be configured to determine which of the industrial devices to operate based on analysis of the industrial data. In an aspect, the correlation analytics component 308 can simulate an operating scenario for the industrial devices represented by initial conditions based on the industrial system behavioral model. The initial conditions can be random initial conditions. The initial conditions can include load data, industrial device identification data, industrial device capacity data, industrial device efficiency data, power consumption data, cost data and/or other data. In one example, the correlation analytics component 308 can apply a set of operational rules for the operating scenario. Operation rules can include rules such as, but not limited to, use at least two industrial devices for the operating scenario, worst single industrial device for the operating scenario should be able to fulfill critical demand, etc. In another aspect, the correlation analytics component 308 can determine whether the operating scenario for the industrial devices is associated with a maximum efficiency. In one example, the correlation analytics component 308 can modify the initial conditions in response to a determination that the operating scenario for the industrial devices is not associated with the maximum efficiency. In another example, the correlation analytics component 308 can generate the at least one set point parameter in response to a determination that the operating scenario for the industrial devices is associated with the maximum efficiency.

Modeling component 310 can be configured to generate the industrial system behavioral model based on the industrial data (e.g., process variable data, operational data, configuration data, sensor data, or other information collected from the industrial devices). For example, the modeling component 310 can generate an industrial system behavioral model for storage on the cloud platform based on analysis of the industrial data. The industrial system behavioral model can define at least one correlation between efficiency and capacity associated with the industrial devices. Modeling component 310 can incrementally refine the industrial system behavioral model as new industrial data is collected to produce a progressively higher fidelity model over time.

Command execution component 312 can be configured to securely provide the command data (e.g., set point parameters, operating commands, open/close commands, operating parameter values, etc.) to the one or more industrial assets (e.g., the industrial systems $202_{1-N}$ and/or the cloud agents $204_{1-N}$). The command execution component 312 can establish a secure connection (e.g., a secure communication channel) with a cloud agent of the industrial system that is located remotely from the cloud platform associated with the cloud-based industrial control system 302. For example, the command execution component 312 can establish an encrypted communication channel between the cloud agent and the cloud platform associated with the cloud-based industrial control system 302. In an aspect, the command execution component 312 can transmit a request to the cloud agent of the industrial system that is located remotely from the cloud platform associated with the cloud-based industrial control system 302. The request can include a request to execute the command data via the one or more industrial assets (e.g., the industrial systems $202_{1-N}$ and/or the cloud agents $204_{1-N}$). The request can initiate an exchange of digital certificates to enable the encrypted communication channel. Additionally or alternatively, the request can include and/or can initiate transmission of the command data to the cloud agent of the industrial system that is located remotely from the cloud platform associated with the cloud-based industrial control system 302.

Command execution component 312 can also be configured to receive one or more alert messages from the cloud agent of the industrial system that is located remotely from the cloud platform associated with the cloud-based industrial control system 302. For, the command execution component 312 can receive an alert message from the cloud agent that indicates that an execution process associated with execution of the command data via the one or more industrial assets satisfies a defined criteria. In one example, the command execution component 312 can receive an alert message from the cloud agent that indicates that the command data is not approved for execution on the one or more industrial assets. In another example, the command execution component 312 can receive an alert message from the cloud agent that indicates that an interval of time for execution of the command data is above a defined threshold level. In yet another example, the command execution component 312 can receive an alert message from the cloud agent that indicates that the command data has been execution on the one or more industrial assets (e.g., that an execution process associated with execution of the command data via the one or more industrial assets is complete).

The one or more processors 314 can perform one or more of the functions described herein with reference to the systems and/or methods disclosed. Memory 316 can be a computer-readable storage medium storing computer-executable instructions and/or information for performing the functions described herein with reference to the systems and/or methods disclosed.

Figure 4:
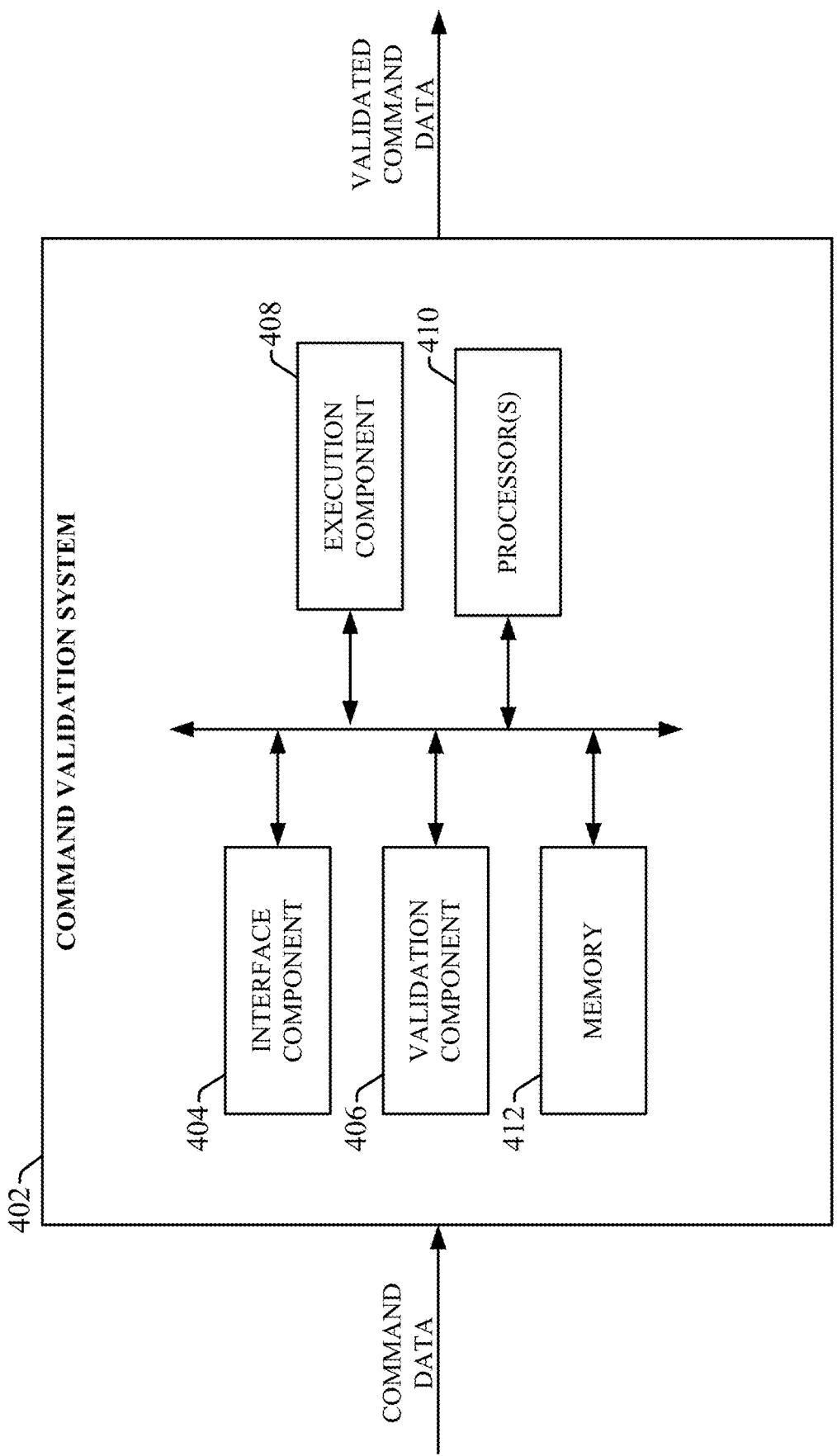
FIG. 4 is a block diagram of an example command validation system.

FIG. 4 is a block diagram of an example command validation system 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. In an aspect, the command validation system 402 can be associated with a cloud platform (e.g., the cloud platform 102 and/or the cloud platform 216).

Command validation system 402 can include an interface component 404, a validation component 406 and/or an execution component 408. The command validation system 402 can also include one or more processors 410 and memory 412. In various embodiments, one or more of the interface component 404, the validation component 406, the execution component 408, the one or more processors 410, and memory 412 can be electrically and/or communicatively coupled to one another to perform one or more of the functions of the cloud-based industrial control system 302. In some embodiments, components 404, 406, and 408 can comprise software instructions stored on memory 412 and executed by processor(s) 410. Command validation system 402 may also interact with other hardware and/or software components not depicted in FIG. 4. For example, processor(s) 410 may interact with one or more external user interface devices, such as a keyboard, a mouse, a display monitor, a touchscreen, or other such interface devices.

Interface component 404 can be configured to provide (e.g., transmit) industrial data (e.g., industrial device data, operational data, configuration data, sensor data, etc.) to a cloud service system (e.g., the cloud platform 102, the cloud platform 216, the cloud-based industrial control system 302, etc.). The industrial data can be associated with and/or generated by an industrial device (e.g., industrial device $208_{1-N}$) and/or an industrial system (e.g., industrial system $104_{1-N}$, industrial system $202_{1-N}$). In response to receiving the industrial data, the cloud service system can analyze the industrial data and/or can generate command data (e.g., set point parameters, operating commands, open/close commands, operating parameter values, etc.) for an industrial device based on the industrial data. For example, the command data can be generated as more fully disclosed herein with respect to the cloud-based industrial control system 302.

Interface component 404 can also be configured to receive the command data for an industrial device. The command data can be received from the cloud service system (e.g., the cloud-based industrial control system 302) that generates the command data. The interface component 404 can receive the command data via a secure communication channel between the command validation system 402 (e.g., the interface component 404) and the cloud service system (e.g., the cloud-based industrial control system 302). The secure communication channel can be an encrypted communication channel. The secure communication channel can be associated with a network. For example, the secure communication channel can be associated with a network that include one or more wireless networks and/or one or more wired networks, including but not limited to, a wide area network (WAN, e.g., the Internet), a local area network (LAN), a personal area network (PAN) and/or a cellular network. As such, the command validation system 402 can be located remotely with respect to the cloud service system and/or can be in communication with the cloud service system via the network. In one example, the command data can indicate a destination industrial device and/or a destination industrial system for the command data. Therefore, the interface component 404 can analyze the command data to determine an industrial device and/or an industrial system for the command data. In an aspect, the interface component 404 can receive a request from the cloud service system to execute the command data via the industrial device. The request can initiate an exchange of digital certificates between the interface component 404 and the cloud service system to enable the secure communication channel.

Validation component 406 can be configured to validate the command data for the industrial device indicated by the command data. In an aspect, the validation component 406 can validate the command data for the industrial device based on execution manifest data. The execution manifest data can be stored by the command validation system 402 (e.g., in the memory 412) and/or a database in communication with the command validation system 402. For example, the execution manifest data can be predetermined and/or stored before the industrial data is generated for the industrial device. The execution manifest data can also be customized for the industrial device. At least a portion of the execution manifest data can be generated based on user input data provided by a client device (e.g., a desktop computer, a laptop computer, a tablet computer, a smartphone, another type of user device, etc.) in communication with the command validation system 402. Additionally or alternatively, at least a portion of the execution manifest data can be generated based on historical data previously generated by the industrial device and/or the cloud service system (e.g., the cloud-based industrial control system 302). In one example, the execution manifest data can be a security manifest retained by command validation system 402 (e.g., in the memory 412) and/or an industrial system associated with the command validation system 402 that is located remotely from the cloud service system (e.g., the cloud-based industrial control system 302). For example, the security manifest can be encrypted security data (e.g., an encrypted document) that includes a set of security validation requirements for the command data.

The execution manifest data can include information (e.g., metadata) associated with the industrial device and/or an industrial system associated with the industrial device. For example, the execution manifest data can include a definition that includes a set of criteria (e.g., a set of security criteria), a set of conditions, specification details and/or other information for the industrial device and/or an industrial system associated with the industrial device. Therefore, the validation component 406 can verify that the command data aligns with the set of criteria (e.g., the set of security criteria), the set of conditions, the specification details and/or the other information included in the execution manifest data. In one example, the validation component 406 can verify that the command data satisfies a defined criteria associated with an operating condition of the industrial device. The defined criteria associated with the operating condition of the industrial device can be defined in the execution manifest data. In another example, the validation component 406 can verify that the command data is within a set of defined operating limits included in the execution manifest data. In an aspect, the execution manifest data can be encrypted. As such, the validation component 406 can decrypt the execution manifest data (e.g., decrypt the set of criteria, the set of security criteria, the set of conditions, specification details and/or the other information for the industrial device and/or the industrial system) in response to receiving the command data via the secure communication channel.

In response to a determination by the validation component 406 (e.g., by employing the execution manifest data) that the command data is approved for the industrial device, the validation component 406 can establish a secure communication link (e.g., a secure communication channel) with the industrial device and/or the industrial system associated with the industrial device. For example, the validation component 406 can initiate an execution process for the command data to allow the command data to be received and/or executed by the industrial device. In an aspect, the validation component 406 can transmit an alert message to the cloud service system in response to a determination that the command data is not approved for execution on the industrial device. For example, the validation component 406 can transmit an alert message to the cloud service system based on a notification route indicated by the execution manifest data (e.g., the security manifest). In one example, the validation component 406 can transmit an alert message to the cloud service system via the secure communication channel associated with the transmission of the command data. In another example, the validation component 406 can transmit an alert message to the cloud service system via a new secure communication channel between the command validation system 402 (e.g., the interface component 404) and the cloud service system (e.g., the cloud-based industrial control system 302). In another aspect, the validation component 406 can transmit an alert message to the cloud service system in response to a determination that an execution process associated with the execution of the command data via the industrial device satisfies a defined criteria. In one example, the validation component 406 can transmit an alert message to the cloud service system in response to a determination that the command data is not approved for execution on the industrial device.

Execution component 408 can be configured to transmit the command data to the industrial device via the secure communication link. The execution component 408 can also initiate execution of the command data via the industrial device. In an aspect, the execution component 408 can determine a set of processing roles for the execution of the command data based on context manifest data retained by command validation system 402 (e.g., in the memory 412) and/or an industrial system associated with the command validation system 402 that is located remotely from the cloud service system (e.g., the cloud-based industrial control system 302). For example, the context manifest data can manage processing roles for the execution of the command data by one or more execution engines. The execution component 408 can also determine whether an interval of time for the execution of the command data is above a defined threshold level. The interval of time can be associated with an execution time lapse for a task expiration. In one example, the execution component 408 can transmit an alert message to the cloud service system in response to a determination that an interval of time for execution of the command data is above a defined threshold level. In another example, the execution component 408 can transmit an alert message to the cloud service system in response to a determination that the command data has been execution on the industrial device (e.g., that an execution process associated with execution of the command data via the industrial device is complete).

Figure 5:
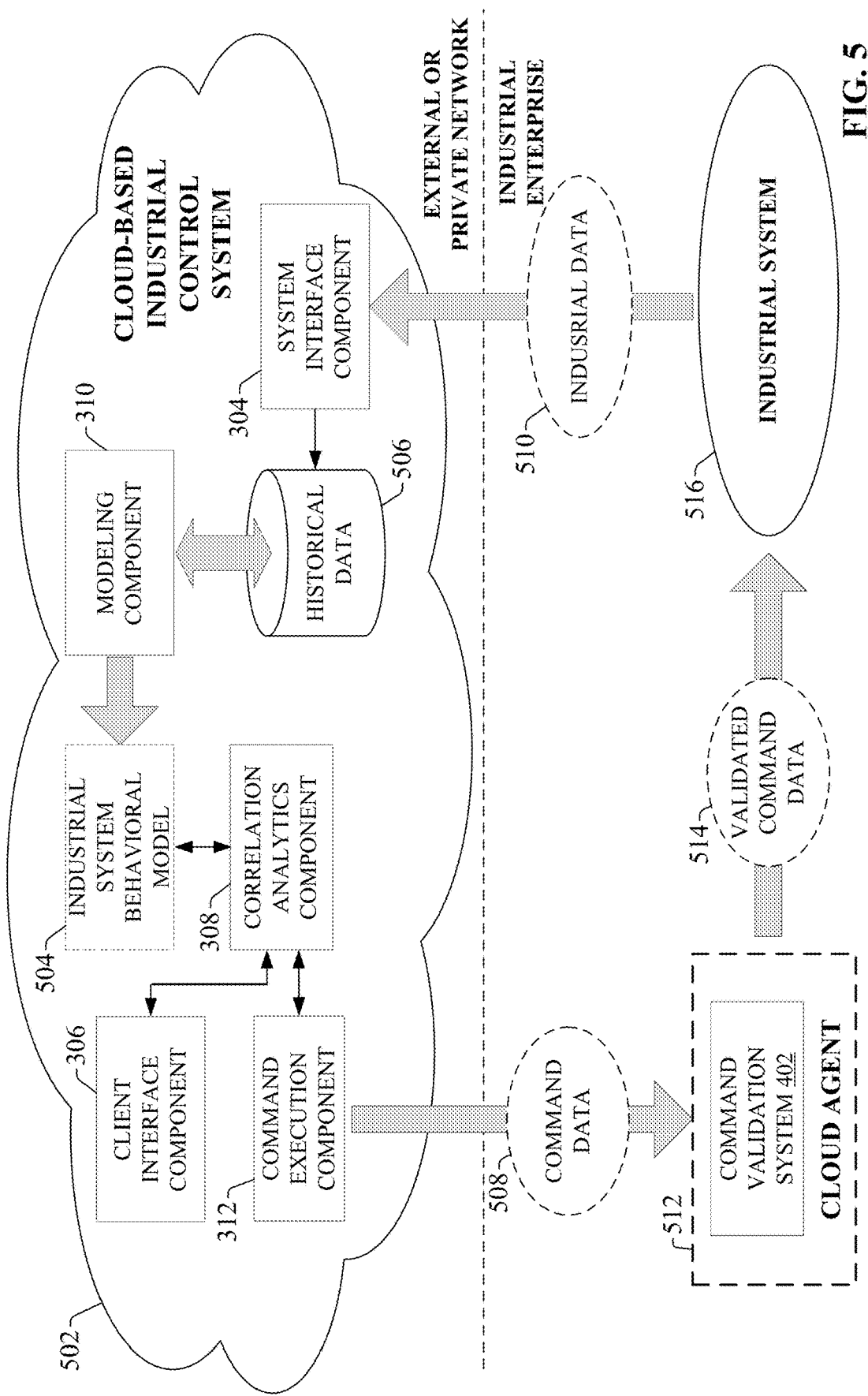
FIG. 5 is a block diagram illustrating an example cloud-based industrial control system in connection with a boiler system.

FIG. 5 is a block diagram illustrating an example cloud-based industrial control system that securely provides command data to an industrial system. As described above, the components of the industrial control system can be collectively implemented in a cloud platform 502 (e.g., cloud platform 102, cloud platform 216, etc.) as a service accessible to authorized users (e.g., subscribers to the cloud-based industrial control system). Industrial system 516 is deployed at a plant facility, and comprises one or more industrial devices (e.g., industrial devices $108_{1-N}$). Industrial data 510 (e.g., industrial data associated with the industrial devices $108_{1-N}$) is collected from the industrial system 516 and sent to the cloud platform 502 via system interface component 304. The system interface component 304 can maintain a communication channel between the cloud platform 502 and one or more industrial devices or cloud agent devices on a plant floor associated with the industrial system 516. In some embodiments, the industrial data 510 is provided to the system interface component 304 directly by one or more cloud-capable industrial devices associated with the industrial system 516 (e.g., field devices, sensors, industrial controllers, human-machine interfaces, telemetry devices, etc.). In such embodiments, the one or more industrial devices may include an integrated cloud interface component configured to couple the cloud-aware smart device to the system interface component 304 and exchange data with the cloud platform 502. Alternatively, the industrial data 510 can be provided to the cloud platform 502 by one or more cloud agent devices that collect data from the industrial devices and push the data to the cloud platform 502, as will be described in more detail below.

The industrial data 510 can comprise such information as process variable values for a controlled process (e.g., temperatures, pressures, positions, flows, levels, etc.), device configuration information (e.g., configuration parameters, analog output scale factors configured for an industrial controller, etc.), device or system level faults and alarms, machine cycle time information, calculated key performance indicators (KPIs), measured indicators of system performance over time, device or system documentation, device firmware revisions, demand information association with loads, and/or other such information relating to configuration and/or operating characteristics of the industrial system 516. The industrial data 510 is moved to historical data storage 506, which comprises cloud storage allocated to the industrial enterprise that owns industrial system 516 for storage and analysis of respective industrial data.

As noted above, the cloud-based industrial control system (e.g., the cloud platform 502) generates suitable command data (e.g., command data 508) for a given industrial application by leveraging an industrial system behavioral model 504 built for the industrial system 516 (e.g., a unique industrial system). The industrial system behavioral model 504 defines relationships between efficiency and capacity for the industrial system 516, allowing correlation analytics component 308 to determine suitable command data (e.g., command data 508) for the industrial system 516. Modeling component 310 generates the industrial system behavioral model 504 based on big data analysis of the historical system data (e.g., industrial data) maintained in historical data storage 506. The big data analysis can discover correlations between efficiency and capacity of the industrial system 516, which can be encoded in the industrial system behavioral model 504. Correlation analytics component 308 analyzes the industrial system behavioral model 504 to determine suitable command determined to yield maximum efficiency and/or maximum performance for the industrial system 516.

Command data 508 is delivered by the client interface component 306 to a cloud agent 512. The cloud agent 512 can be an on-premise cloud agent (e.g., on-premise cloud agent $106_{1-N}$ or cloud agent $204_{1-N}$) implemented as an interface between the cloud platform 502 and the industrial system 516. The cloud agent 512 can include the command validation system 402. The command validation system 402 can validate the command data 508, as more fully disclosed herein with respect to FIG. 4. As such, the command validation system 402 can provide a fail safe security mechanism for the industrial system 516 to ensure that the command data 508 can be safely executed via the industrial system 516. In response to a determination by the command validation system 402 that the command data 508 is approved for execution by the industrial system 516, the cloud agent 512 can forward and/or transmit the command data 508 to the industrial system 516 as validated command data 514. The validated command data 514 can then be executed by and/or applied to the industrial system 516. For example, the validated command data 514 can be provided to an industrial controller of the industrial system 516.

The cloud-based architecture described herein supports creation of an industrial control system in the cloud platform 502, thereby leveraging cloud-based analytics and big data analysis to facilitate determining and/or securely providing the command data 508 for optimum efficiency and/or performance associated with the industrial system 516.

In one or more embodiments, the cloud-based industrial control system can employ an iterative analytical procedure to build the industrial system behavioral model 504 and/or determine substantially optimized command data 508 for the industrial system 516. For example, the industrial data 510 associated with the industrial system 516 can be monitored and/or collected in the cloud platform 502 and stored in cloud-based historical data storage 506. The cloud platform 502 can then employ an incremental learning system, whereby the correlation analytics component 308 leverages the industrial system behavioral model 504 to correlate performance metrics of the industrial system 516. In some embodiments, the modeling component 310 can generate the industrial system behavioral model 504 based on historical data collected from industrial devices of the industrial system 516, and may iteratively update the industrial system behavioral model 504 over time as new data (e.g., new industrial data) is gathered from the industrial system 516 and correlated in the cloud platform 502.

This iterative process of generating a simulated process response associated with the industrial system 516 and iteratively modifying command data based on the results comprises a command data optimization loop that gradually converges to the command data 508 determined to yield optimal efficiency and/or performance associated with the industrial system 516. Once the iterative process has completed (e.g., based on a defined completion condition), the command data 508 can be provided to the cloud agent 512. Therefore, the cloud agent 512 can serve as an interface for the cloud-based industrial control process and/or can facilitate a closed-loop system between the cloud platform 502 and the industrial system 516. Moreover, the cloud agent 512 can allow the validated command data 514 to be exported to a separate controller programming interface of the industrial system 516 for download to a controller of the industrial system 516. The cloud-based industrial control system may also save a record of the command data 508 together with a record of the simulated response data on cloud storage in association with a customer identifier associated with an owner of the industrial system 516, thereby providing a backup of command data that can be retrieved at a future time if the controller must be reconfigured due to loss of programming, or if a replacement controller requires configuration.

Providing the industrial control system on a cloud platform command data services to be accessed globally by multiple industrial enterprises or customers from any location. In addition to maintaining individual customer-specific historical data stores for each industrial system, some embodiments of the cloud-based industrial control system can also feed sets of customer data to a collective historical data storage for collective big data analysis in the cloud. For example, the system interface component 304 of the cloud-based industrial control system can collect data from devices and assets comprising respective different industrial systems for storage in the historical data storage 506. In some embodiments, data maintained in the historical data storage 506 can be collected anonymously with the consent of the respective customers. For example, customers may enter into a service agreement with a technical support entity whereby the customer agrees to have their industrial system and asset data collected by the cloud-based industrial control system in exchange for command data services. The historical data storage 506 can organize the collected data according to device type, system type, application type, applicable industry, or other relevant categories.

Modeling component 310 can analyze the resulting multi-industry (e.g., multi-industrial device system), multi-customer data to learn industry-specific, device-specific, machine-specific, and/or application-specific trends, behavior patterns, thresholds, or other information that can be used to characterize relationships between efficiency and capacity of industrial devices across different types of systems, equipment, and devices. In such embodiments, modeling component 310 can perform big data analysis on the multi-enterprise data maintained in collective historical data storage to learn and characterize operational trends or patterns as a function of industry type, application type, equipment in use, industrial asset configuration, device configuration settings, or other such variables. The modeling component 310 can then use results of this analysis to build application-specific industrial system behavior models based on an assessment of a particular customer's control system.

For example, it may be known that a particular industrial asset in use at a given industrial facility (e.g., an industrial device, a boiler, a machine, a unit of equipment, a controller, a drive, etc.) is used across different industries for different types of industrial applications. Accordingly, modeling component 310 can identify a subset of the global data stored in the historical data storage 506 relating to the asset or asset type, and perform analysis on this subset of data to determine how the asset or asset type performs over time for different command data. For example, the modeling component 310 may monitor common industrial data of similar industrial systems, and record the command data used for the respective industrial systems. By collectively analyzing this multi-enterprise data, the modeling component 310 can refine the industrial system behavioral models to more accurately link efficiency and performance associated with an industrial system. By leveraging a large amount of historical data gathered from many different industrial systems, modeling component 310 can learn common operating characteristics of many diverse configurations of industrial assets using different set point parameters at a high degree of granularity and under many different operating contexts.

In some embodiments, modeling component 310 can compare operational behavior of similar industrial applications across different device hardware platform or software configuration settings, and make a determination regarding which combination of hardware, configuration settings, and/or command data yield preferred operational performance. Moreover, modeling component 310 can compare data across different verticals to determine whether system configurations used at one vertical could beneficially be packaged and implemented for another vertical. Some embodiments of the industrial control system can use such determinations as the basis for customer-specific recommendations. In general, the historical data storage 506, together with modeling component 310, can serve as a repository for knowledge capture and best practices for a wide range of industrial systems, industrial devices, industries, industrial applications, and device combinations.

It is to be appreciated that any suitable technique can be used to migrate data from the device-level industrial systems on the plant floor to historical data storage 506. In this regard, the industrial system behavior modeling and industrial analytics performed by the modeling component 310 and the correlation analytics component 308 are agnostic with regard to the specific technology used to ingest plant floor data in the cloud platform. Thus, the analysis of the collected industrial data maintained in historical data storage 506 is decoupled from the particular technologies used to move the industrial data from the plant floor to the cloud platform.

Figure 6:
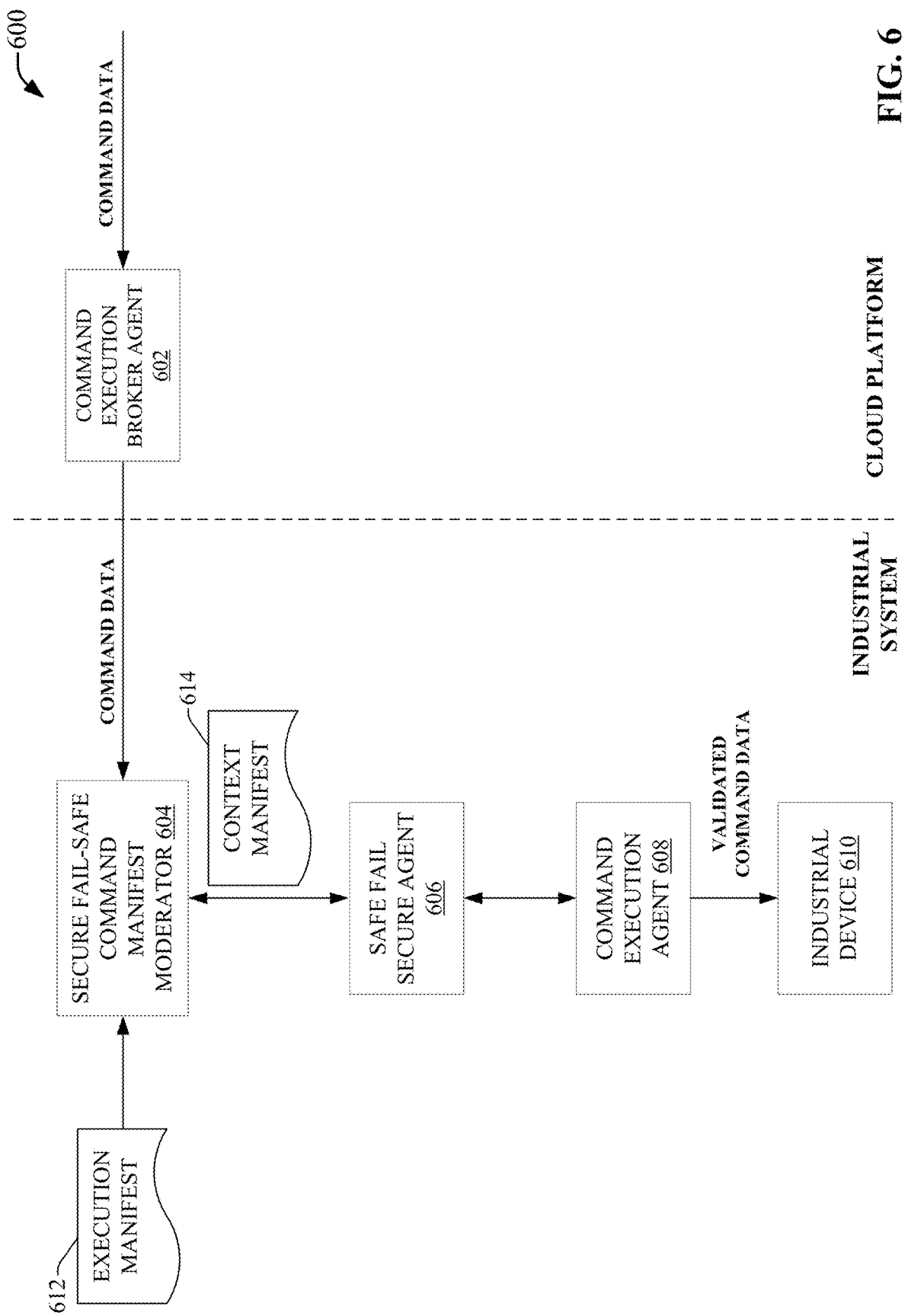
FIG. 6 illustrates an example system that coordinates command execution in a cloud-based industrial control system.

FIG. 6 is a block diagram illustrating an example system 600 that coordinates command execution in a cloud-based industrial control system. The system 600 includes a command execution broker (CEB) agent 602, a secure fail-safe command manifest moderator (SFCMM) 604, a safe fail secure (SFS) agent 606, a command execution (CE) agent 608 and an industrial device 610. The CEB agent 602 can be implemented by a cloud platform (e.g., cloud platform 102, cloud platform 216, etc.) and/or can be associated with a cloud-based industrial control system (e.g., cloud-based industrial control system 302, command execution component 312, etc.). In one example, the CEB agent 602 can be created on demand in the cloud in response to command data being generated for the industrial device 610. The CEB agent 602 can be associated with and/or included in the command execution component 312. The command data can be generated, for example, as more fully disclosed herein with respect to FIG. 3. The SFCMM 604, the SFS agent 606 and/or the CE agent 608 can be implemented by a cloud agent (e.g., on-premise cloud agent $106_{1-N}$, cloud agent $204_{1-N}$, cloud agent 512, etc.). For example, the SFCMM 604, the SFS agent 606 and/or the CE agent 608 can be associated with and/or included in the command validation 110, the command validation engine 318, and/or the command validation system 402.

The CEB agent 602 can receive the command data. The CEB agent 602 of the cloud platform can also transmit a request to the SFCMM 604 of the industrial system (e.g., a cloud agent). The request transmitted by the CEB agent 602 can be a request to execute the command data via the industrial device 610. For example, the CEB agent 602 can transmit the command data to the SFCMM 604. In one example, the request transmitted by the CEB agent 602 can include the command data and/or information associated with the command data (e.g., information associated with the request to execute the command data). In response to receiving the request and/or the command data from the CEB agent 602, the SFCMM 604 can validate the command data based on an execution manifest 612. The SFCMM 604 can perform one or more validation actions in alignment with the execution manifest 612 to validate the command data. The execution manifest 612 can include execution manifest data associated with at least the industrial device 610. For example, the execution manifest 612 can include metadata that describes the industrial device 610 and/or conditions associated with the command data and/or the industrial device. In one example, the SFCMM 604 can compare an industrial device identity indicated by the request and/or the command data with one or more industrial device identities included in the execution manifest 612. In another example, the execution manifest 612 can include a definition that includes a set of criteria (e.g. a set of security criteria), a set of security requirements, a set of conditions, specification details and/or other information for the command data and/or the industrial device 610.

In response to a determination by the SFCMM 604 that the command data is approved, the SFCMM 604 can generate the SFS agent 606. The SFCMM 604 can generate the SFS agent 606 based on the execution manifest 612. The SFS agent 606 can also be associated with an event driven communication framework and/or a control area network. For example, the SFS agent 606 can employ an ad hoc synchronization scheme to control the industrial device 610. The SFS agent 606 can determine an execution process for the command data with respect to the industrial device 610. For example, the SFS agent 606 can determine an execution process for the command data based on a context manifest 614. The context manifest 614 can include context manifest data associated with one or more execution processes for the industrial device 610. The SFS agent 606 can also generate the CE agent 608 based on the context manifest 614. The CE agent 608 can control the execution process of the command data with respect to the industrial device 610. The CE agent 608 can be associated with an execution context to perform execution of at least a portion of the command data with respect to the industrial device 610. The CE agent 608 can provide validated command data to the industrial device 610 and/or can execute the validated command data for the industrial device 610. In one example, the CE agent 608 can be associated with multiple CE agents that each perform different execution contexts associated with the command data.

Figure 7:
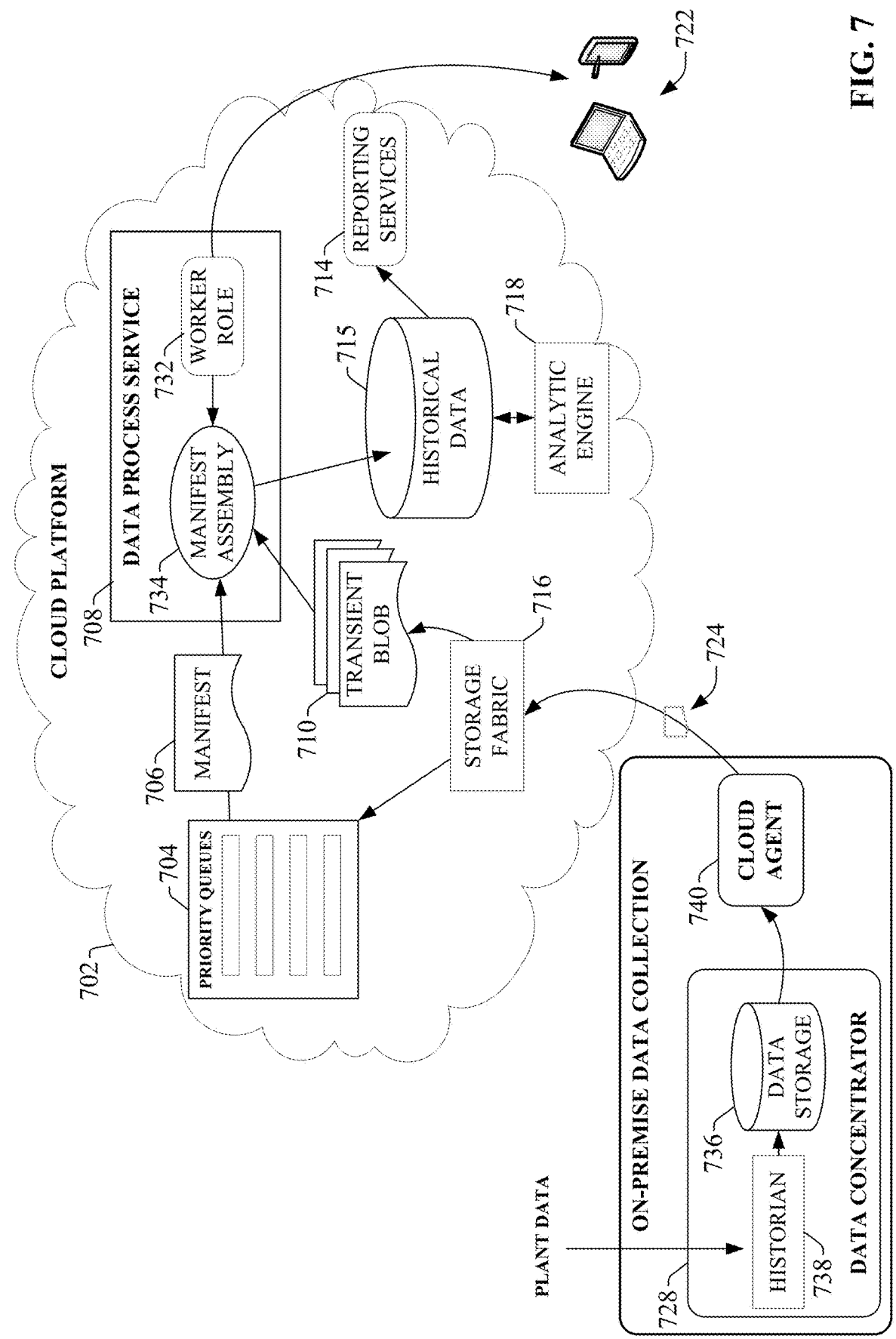
FIG. 7 is a diagram illustrating a system that leverages an agent-based cloud infrastructure to provide data collection and processing services.

In a non-limiting example, data from industrial devices and systems can be provided to a cloud platform 702 (e.g., cloud platform 102, cloud platform 216, cloud platform 502, etc.) for storage and analysis using cloud agent devices in some embodiments. FIG. 7 is an overview of a system that leverages an agent-based cloud infrastructure to provide data collection and processing services (such as the industrial control services described herein) to manufacturing sites associated with industrial systems. This system can provide remote collection and analysis services in connection with remote industrial control.

In the example illustrated in FIG. 7 a data concentrator 728 collects plant data from one or more industrial assets (e.g., data associated with one or more industrial devices) at a plant facility. These industrial assets can include industrial controllers that monitor and/or control industrial I/O devices, data servers and historians, remote I/O interfaces that remotely interface groups of I/O devices to one or more of the industrial controllers, industrial devices, other industrial machines, other such assets, etc. For example, data concentrator 728 can monitor one or more controller tags defined in a tag archive and store data in local data storage 736 (e.g., a local structured query language, or SQL, server) associated with a historian 738. The collected data can include historical data (e.g., alarm history, status history, trend data, etc.), live data values read from the industrial assets, sensor data associated with the industrial assets, alarm data generated by the industrial assets and/or other types of data.

An on-premise cloud agent 740 is configured to collect the live or historical data from the industrial assets, either directly or by accessing data storage 736 associated with data concentrator 728. Cloud agent 740 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to the cloud platform 702. Cloud agent 740 provides a software mechanism to dynamically link on-premise-to-cloud gateways. Cloud agent 740 provides an expandable data type schema that allows new data types to be added without the need to redeploy the monitoring system to the cloud.

During data collection, the cloud agent 740 can intelligently sort and organize the data based on defined criteria, including but not limited to time of occurrence and/or user-defined priorities. Cloud agent 740 can be, for example, a service (e.g., a Windows service) that periodically collects and transmits serialized and compressed data into the cloud domain using standard web services over HTTPS/SSL.

FIG. 7 depicts data concentrator 728 as the data source for cloud agent 740. This configuration can be useful if there are a large number of data points to monitor, since the data concentrator can 728 can link multiple industrial devices or other data sources to a single cloud agent 740. However, some embodiments of cloud agent 740 can collect data directly from the industrial assets themselves; e.g., through a common industrial protocol link, or through middleware applications such as OPC clients.

Figure 8:
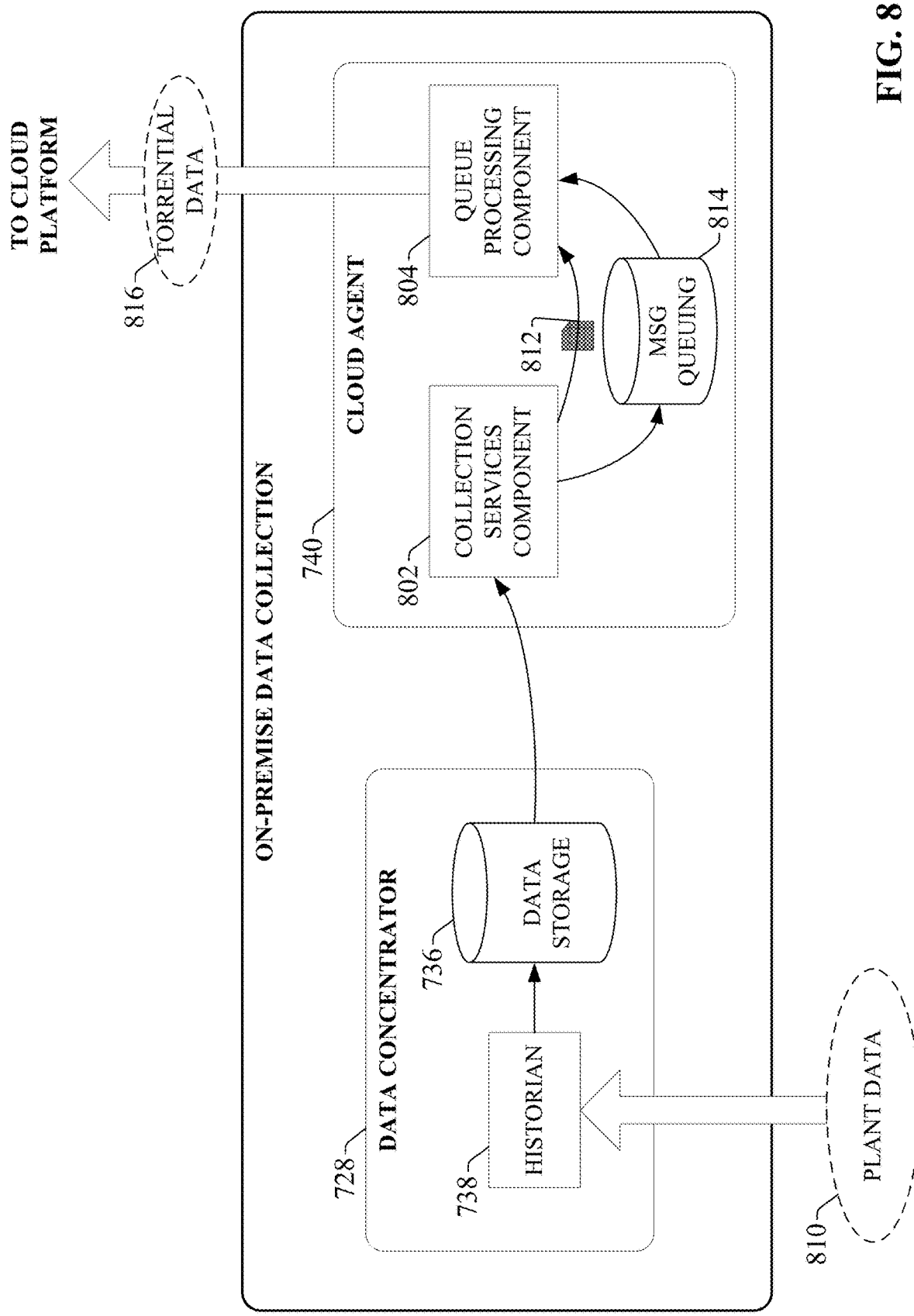
FIG. 8 is a block diagram illustrating on-premise data collection.

Cloud agent functionality is illustrated in more detail with reference to FIG. 8. On-premise data collection is enabled by a collection of services that function as a virtual support engineer for processing data. Data concentrator 728 and cloud agent 740 respectively implement two main functions associated with data collection—data concentration using a historian 738 and associated data storage 736 (e.g., an SQL server), and cloud data enablement using cloud agent services executed by cloud agent 740. As noted above, plant data 810 (e.g., industrial data and/or demand data) is collected by data concentrator 728 at the plant facility. In an example scenario, plant data 810 may comprise time series sensor data made up of thousands of data points updated at a rate of less than a second.

Collection services component 802 of cloud agent 740 implements collection services that collect device data, either from data concentrator's associated data storage (e.g., via an SQL query) or directly from the devices themselves via a common industrial protocol (CIP) link or other suitable communication protocol. For example, to obtain data from data concentrator 728, collection services component 802 may periodically run a data extraction query (e.g., an SQL query) to extract data from data storage 736 associated with data concentrator 728. Collection services component 802 can then compress the data and store the data in a compressed data file 812. Queue processing services executed by queue processing component 804 can then read the compressed data file 812 and reference a message queuing database 814, which maintains and manages customer-specific data collection configuration information, as well as information relating to the customer's subscription to the cloud platform and associated cloud services. Based on configuration information in the message queuing database 814, queue processing component 804 packages the compressed data file 812 into a data packet and pushes the data packet to the cloud platform. In some embodiments, the cloud agent 740 can support injecting data packets as torrential data 816.

Message queuing database 814 can include site-specific information identifying the data items to be collected (e.g., data tag identifiers), user-defined processing priorities for the data tags, firewall settings that allow cloud agent 740 to communicate with the cloud platform through a plant firewall, and other such configuration information. Configuration information in message queuing database 814 instructs cloud agent 740 how to communicate with the identified data tags and with the remote data collection services on the cloud platform.

In addition to collection and migration of data, one or more embodiments of cloud agent 740 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent 740 may be configured to compress the collected data using any suitable data compression algorithm prior to migrating the data to the cloud platform. This can include detection and deletion of redundant data bits, truncation of precision bits, or other suitable compression operations. In another example, cloud agent 740 may be configured to aggregate data by combining related data from multiple sources. For example, data from multiple sensors measuring related aspects of an automation system (e.g., an industrial system) can be identified and aggregated into a single cloud upload packet by cloud agent 740. Cloud agent 740 may also encrypt sensitive data prior to upload to the cloud. In yet another example, cloud agent 740 may filter the data according to any specified filtering criterion (e.g., filtering criteria defined in a filtering profile stored on the cloud agent). For example, defined filtering criteria may specify that pressure values exceeding a defined set point are to be filtered out prior to uploading the pressure values to the cloud.

In some embodiments, cloud agent 740 may also transform a specified subset of the industrial data and/or the demand data from a first format to a second format in accordance with a requirement of a cloud-based analysis application. For example, a cloud-based reporting application may require measured values in ASCII format. Accordingly, cloud agent 740 can convert a selected subset of the gathered data (e.g., the industrial data and/or the demand data) from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent 740 may also associate metadata with selected subsets of the data prior to migration to the cloud, thereby contextualizing the data within the industrial environment (e.g., industrial system environment). For example, cloud agent 740 can tag selected subsets of the data (e.g., the industrial data and/or the demand data) with a time indicator specifying a time at which the data was generated, a quality indicator, industrial device identifier, industrial system identifier, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent 740 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent 740 can support HTTPS/SSL, certificate authority enabled transmission, and/or unique identity using MAC addresses. Cloud agent 740 can also support store-and-forward capability to ensure data is not lost if the agent becomes disconnected from the cloud.

Returning now to FIG. 7, cloud agent 740 sends compressed data packet 724 to the cloud-based data collection and monitoring system on cloud platform 702 via a cloud storage fabric 716. The data packet 724 conveys parameters and data (compressed and serialized) used by the cloud-side services to reconstruct the domain data structure in the cloud using auxiliary tenant-level manifests. The cloud services direct remote storage of the received data into preconditioned transient blobs 710. The cloud platform 702 can use agent reasoning and collective bargain features to determine a data storage locale.

Through the configuration interface provided by cloud agent 740, users at the plant facility can dynamically configure one or more priority queues 704 that respectively define how the data packets are processed in the cloud platform 702. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent 740 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, current levels, current flow, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent 740 can allow the user to define these priority queues 704 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage (e.g., historical data storage 715). Accordingly, the live data queue may be assigned a higher priority relative to the historical data queue, since data in the live data queue is more time-critical than data in the historical queue.

Through cloud agent 740, users can assign priorities to respective data tags or tag groups at the customer site. These priority assignments can be stored in the message queuing database 814 of the cloud agent 740. Accordingly, when queue processing component 804 packages the collected data to be moved to the cloud platform, the collected data items can be packaged into data packets according to priority (as defined in message queuing database 814), and the respective data packet headers populated with the appropriate priority level. If access to the cloud is unavailable, data will continue to be collected by collection services component 802 and stored locally on the cloud agent in local storage associated with collections services. When communication to the cloud is restored, the stored data will be forwarded to cloud storage. Queue processing services can also encrypt and send storage account keys to the cloud platform for user verification.

Figure 9:
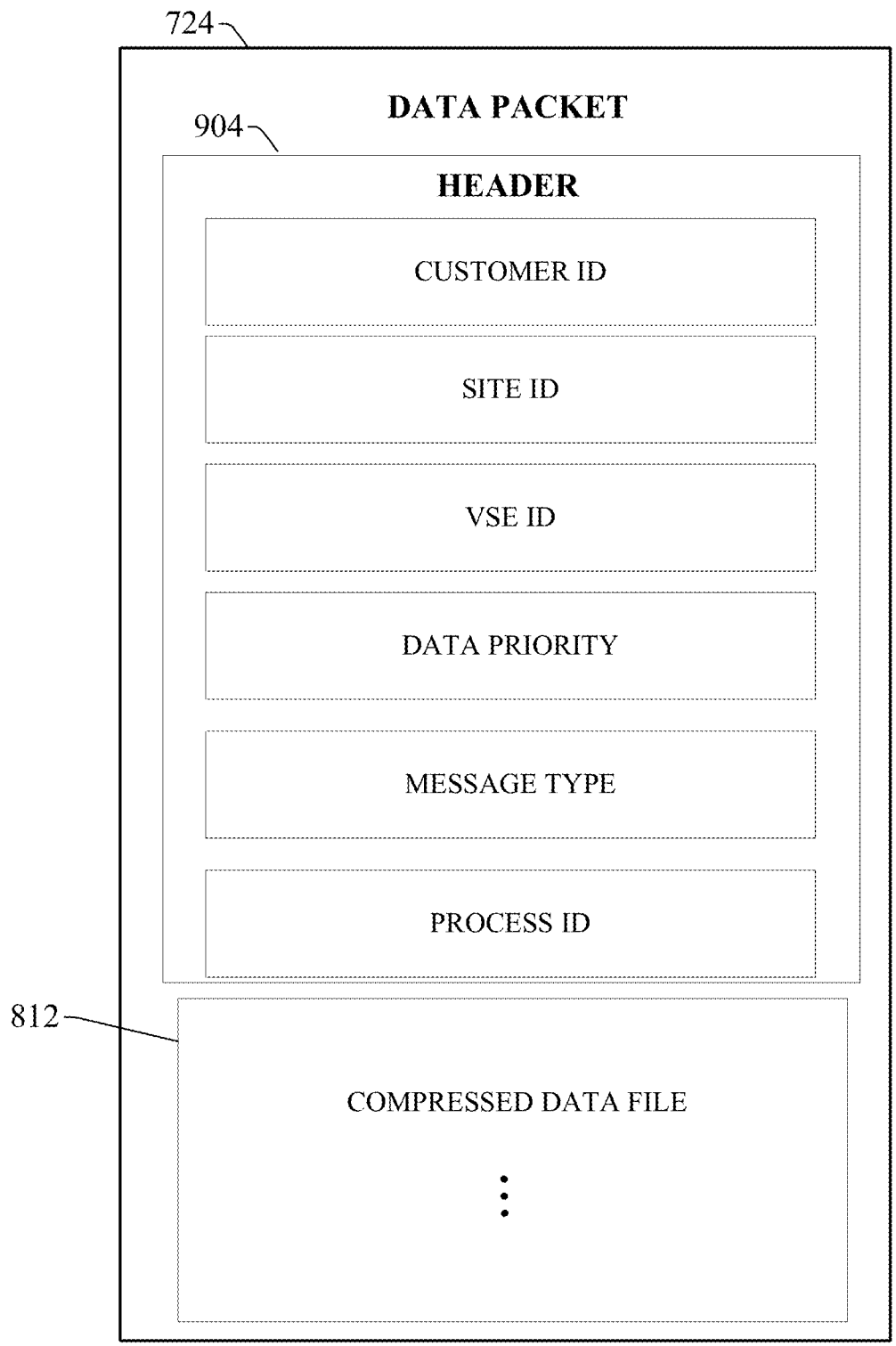
FIG. 9 is a diagram of an example compressed data packet.

Message queuing services implemented by queue processing component 804 of cloud agent 740 encapsulates or packages the compressed data file by adding customer-specific header information to yield a compressed data packed (e.g., compressed data packet 724 of FIG. 7). For example, the queue processing component 804 can access a message queuing database (e.g., message queuing database 814 of FIG. 8), which stores customer site configuration information and manages the customer's subscription to the cloud platform services. The message queuing database 814 may include such information as a customer identifier associated with the customer entity associated with the industrial enterprise (e.g., the industrial system), an industrial device identifier, an industrial system identifier, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 9. As shown, the cloud agent's message queuing services add a header 904 to compressed data file 812 to yield the compressed data packet 724. The header 904 contains customer-specific data read from message queuing database 814. For example, header 904 can include a unique customer identifier, a site identifier representing a particular plant facility, an industrial device identifier, an industrial system identifier, a virtual support engineer identifier, a data priority for the data (e.g., the industrial data and/or the demand data) in the compressed data file 812, a message type, and a process identifier that specifies a particular manifest application on the cloud platform that should be used to process the data on the cloud side. Packaging the data (e.g., the industrial data and/or the demand data) in this way can allow data from diverse data sources to be packaged together using a uniform, generic data packaging schema so that the data can be moved to the cloud infrastructure When cloud agent 740 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 704 based on the priority. On the other side of the priority queues 704, a data process service 708 processes data in the respective priority queues 704 according to the predefined processing definitions. The data processing service includes a worker role 732 that determines how the queued data is to be processed based on manifests (e.g., system manifests, tag manifests, and metric manifests) stored in a customer-specific manifest assembly 734. Manifests define and implement customer-specific capabilities, applications, and preferences for processing collected data in the cloud. Manifests can be dynamically uploaded by a user at the plant facility through cloud agent 740, which facilitates dynamic extension of cloud computing capability.

For example, if new data points are to be added to the data collection system that require creation of a new data queue, the user can interact with cloud agent 740 to configure a new manifest for the new queue, the manifest defining such aspects as processing priority for the data, upload frequency for the data, where the data is to be routed or stored within cloud storage, and other such information. Cloud agent 740 can then upload the new manifest 706 together with the data (or independently of the data). The new manifest 706 is then added to the customer's manifest assembly 734 with the other manifests defined for the customer, so that worker role 732 can leverage the new manifest 706 to determine how data in the new queue is to be processed. This new manifest 706 need only be uploaded to the cloud-based remote monitoring service once. Thereafter, data placed in the new priority queue will be processed by worker role 732 according to the new manifest 706 stored in the customer's manifest assembly 734. For example, the manifest may define where the data is to be stored within cloud storage (e.g., historical data storage 715, an Alarms and Live Data database, etc.), and whether processing of the new data queue is to take priority over other data queues. In some embodiments, the manifest assembly 734 may only accept a new manifest if the manifest is accompanied by a unique key associated with the client.

Once the cloud-based infrastructure has processed and stored the data provided by cloud agent 740 according to the techniques described above, the data can be made accessible to client devices 722 (e.g., user devices) for viewing. Data analysis on the cloud platform 702 can provide a set of web-based and browser enabled technologies for retrieving, directing, and uncompressing the data from the cloud platform 702 to the client devices 722. To this end, reporting services 714 can deliver data in cloud storage (e.g., from historical data storage 715, or controller gain values generated by correlation analytics component 308) to the client devices 722 in a defined format. For example, reporting services 714 can leverage collected data stored in the cloud repository to provide remote operator interfaces to client devices 722 over the Internet. An analytic engine 718 executing on the cloud platform 702—and which may include correlation analytics component 308—can also perform various types of analysis on the data stored in big data storage 712 and provide results to client devices 722.

Figure 10:
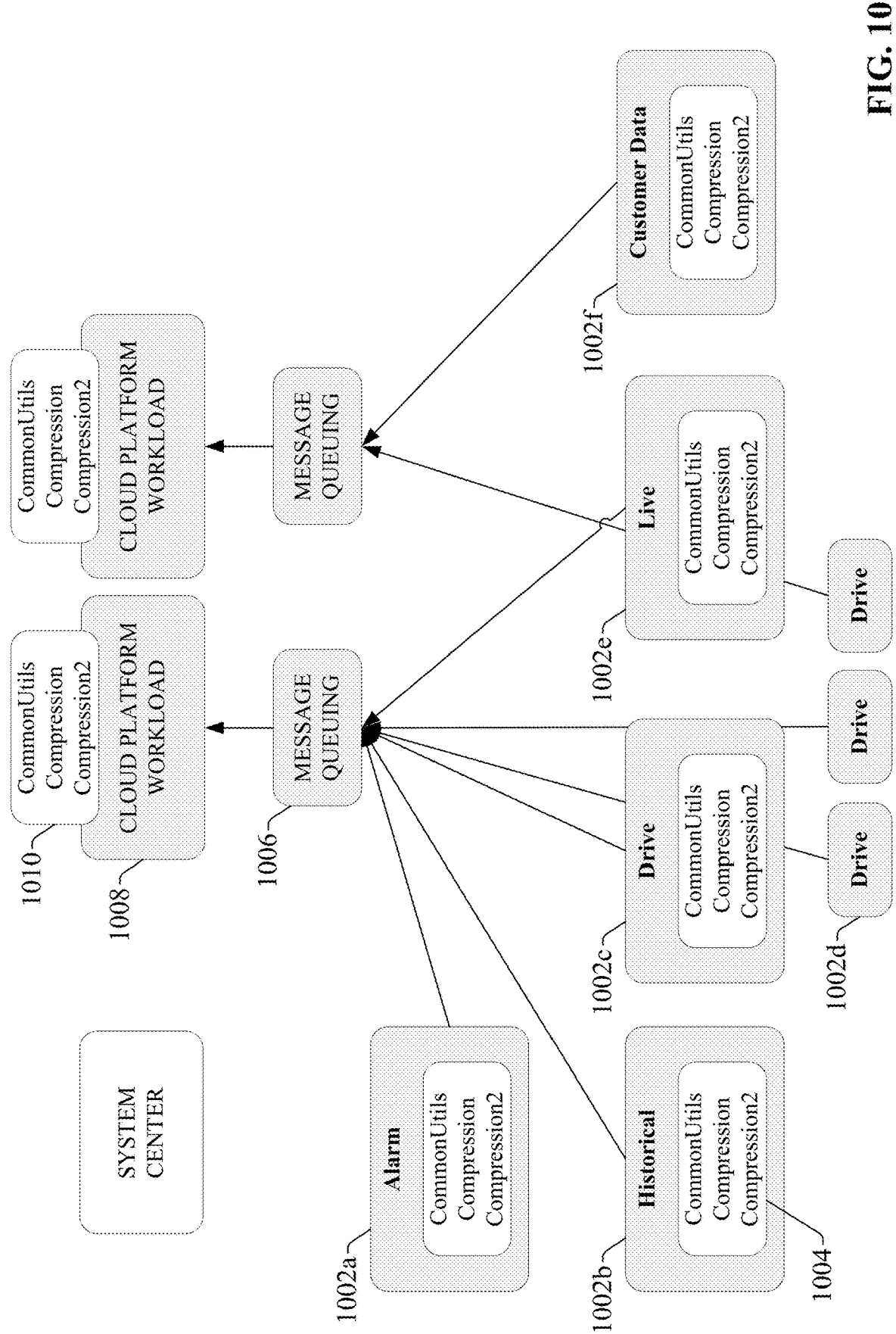
FIG. 10 is a block diagram of an example agent architecture for collection of data from on-premise industrial devices.

FIG. 10 is a block diagram illustrating an example agent architecture for collection of data (e.g., the industrial data and/or the demand data) from on-premise industrial devices according to one or more embodiments. In this example, data is collected from a number of devices and applications 1002 at the customer site, including an alarm database 1002a, data historian 1002b, motor drives 1002c and 1002d, live data server 1002e, and a customer database 1002f. Although these data sources comprise a diverse, heterogeneous collection of devices and applications, collection and pre-processing of data from these sources can be carried out by generic services 1004 (e.g., service libraries). Generic services 1004 can include utilities for identifying the data locations (e.g., devices, applications, tags, registers, etc.) from which data (e.g., the industrial data and/or the demand data) is to be retrieved, utilities for compressing or otherwise pre-processing the data, and providing the data to the message queuing layers 1006 of the cloud agents. The workload services 1008 of the cloud agents can also utilize generic services 1010 to encapsulate and send the data to the cloud fabric. The message queuing layers 1006 and workload services 1008 make up the backbone of the decoupled agent architecture.

Figure 11:
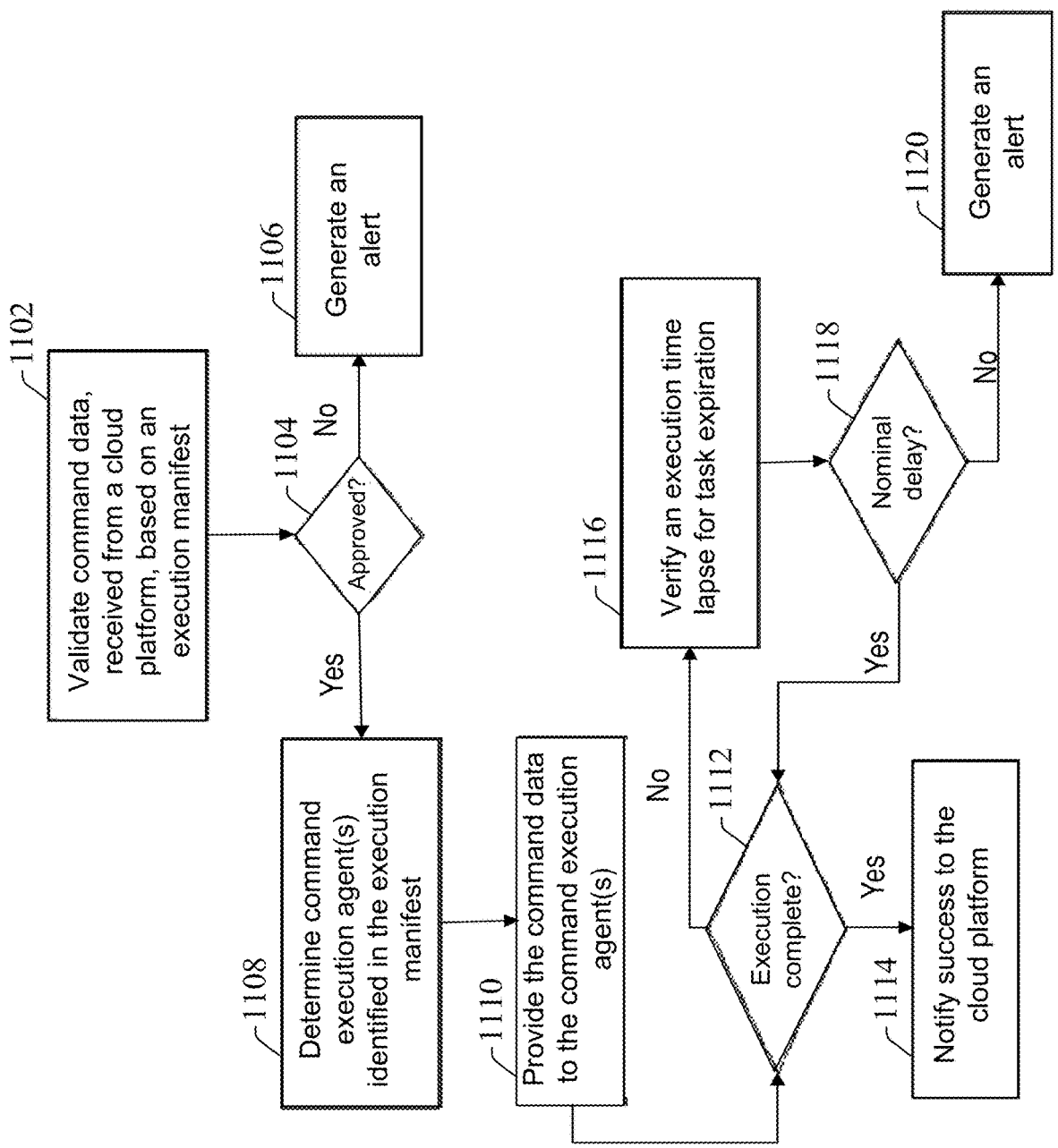
FIG. 11 is a flowchart of an example methodology for securely executing command data received from a cloud platform.
Figure 12:
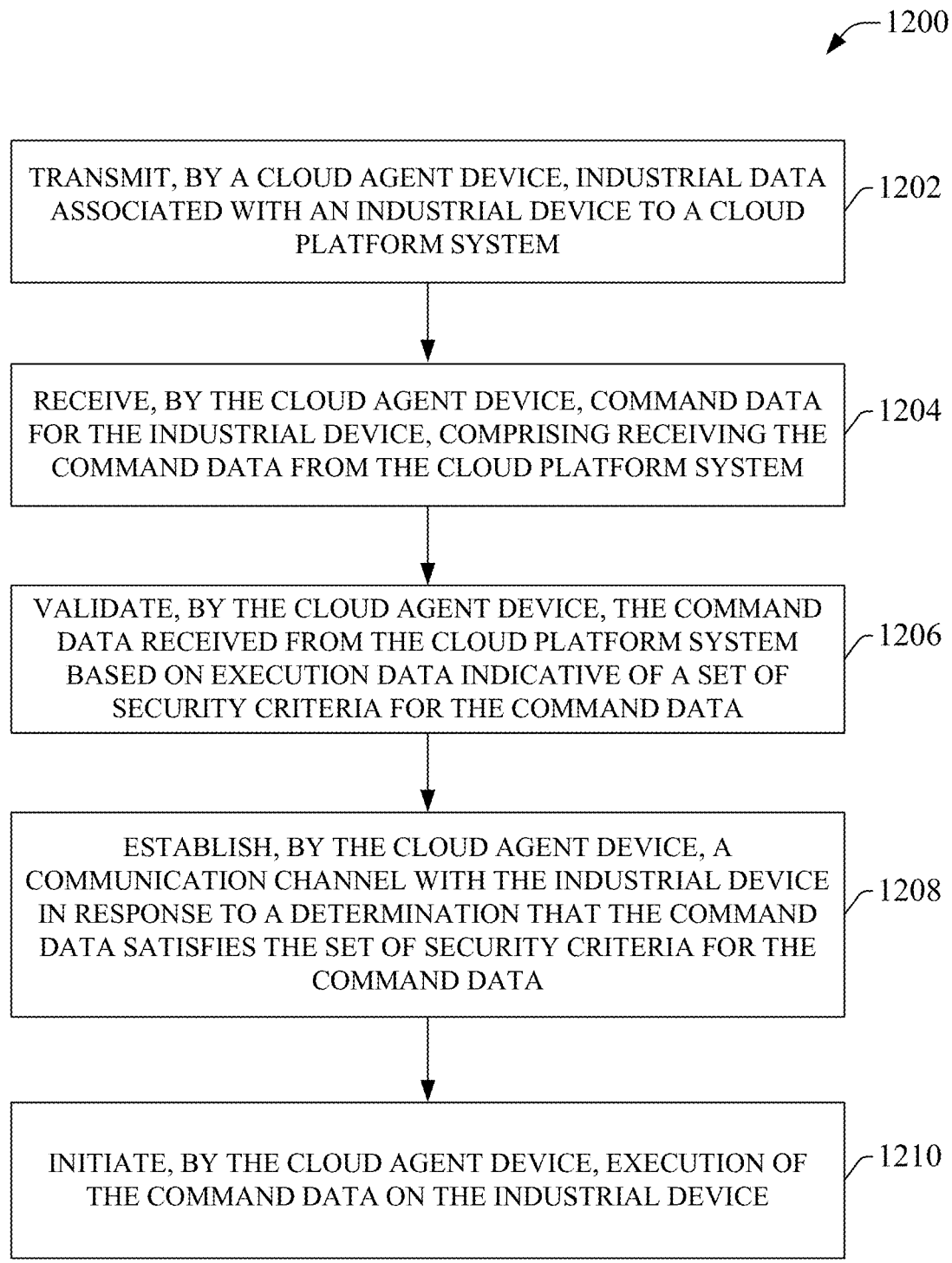
FIG. 12 is a flowchart of an example methodology for validating command data received from a cloud platform system.
Figure 13:
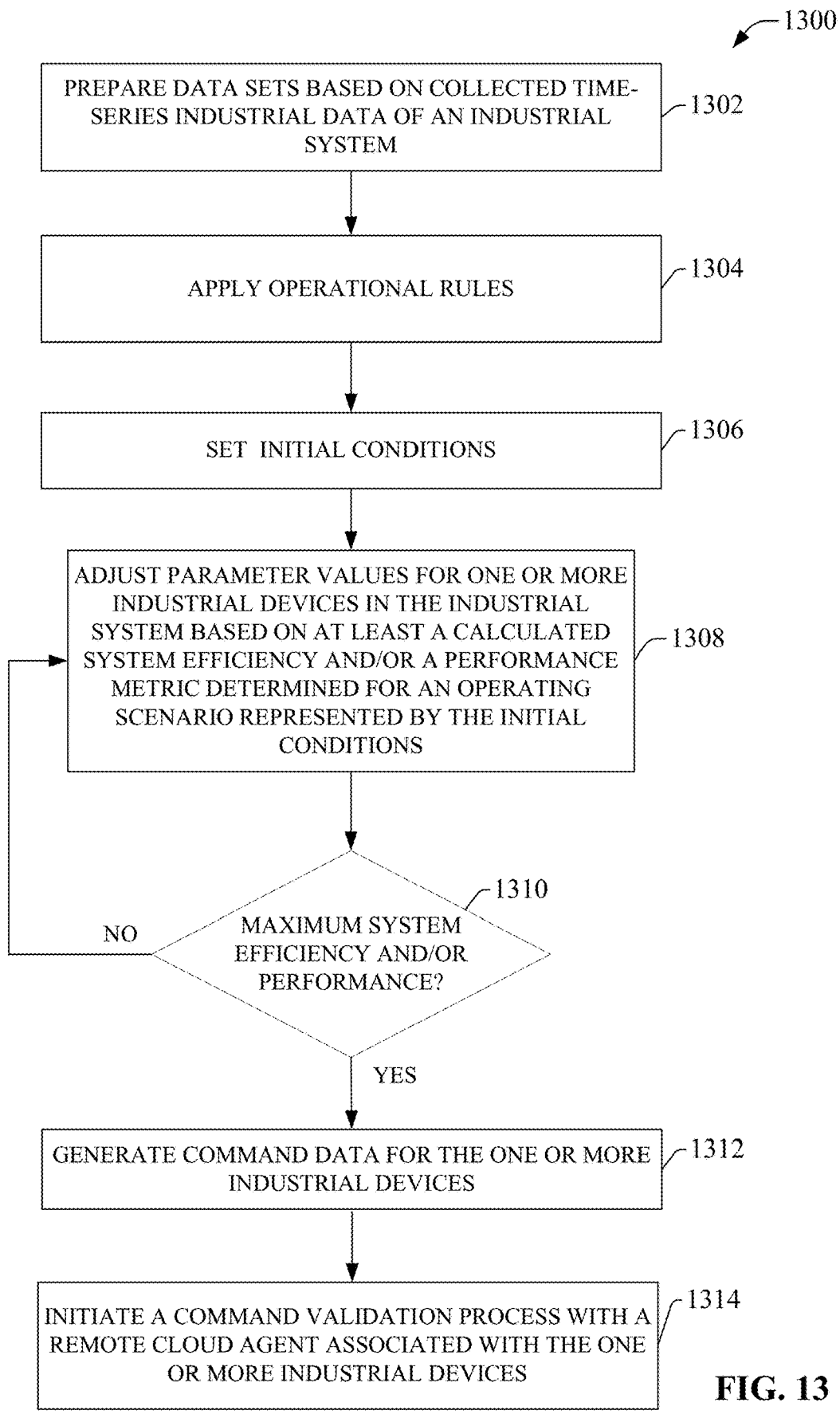
FIG. 13 is a flowchart of an example methodology for determining and/or executing command data for an industrial device.

FIGS. 11-13 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 11 illustrates an example methodology 1100 for securely executing command data received from a cloud platform. In an aspect, methodology 1100 can be associated with a command validation system 402. Initially, at 1102, command data, received from a cloud platform, is validated based on an execution manifest. The command data can include a set point parameters, a set of operating commands, a set of open/close commands, a set of operating parameter values and/or other data for an industrial device associated with an industrial system and/or an industrial site. The execution manifest can include encrypted security data associated with the a set of security requirements for the command data. The execution manifest can also be stored remotely from the cloud platform at the industrial system and/or the industrial site.

At 1104, it is determined whether the command data is approved. For example, it can be determined whether the command data satisfies the set of security requirements included in the execution manifest. If no, methodology 1100 proceeds to 1106. At 1106, an alert is generated and the methodology 1100 ends. For example, the alert can be an alert that is transmitted to the cloud platform to inform the cloud platform that the command data is not valid for execution by the industrial device. If yes, methodology 1100 proceeds to 1108. At 1108, one or more command execution agents identified in the execution manifest are determined. The one or more command execution can be one or more processing engines that perform unique roles with respect to executing the command data via the industrial device. At 1110, the command data is provided to the one or more command execution agents. At 1112 it is determined whether execution of the command data is complete. If yes, the methodology 1100 proceeds to 1114. At 1114, success of the execution is notified to the cloud platform and the methodology 1100 ends. For example, a message can be transmitted to the cloud platform to inform the cloud platform that an execution process for executing the command data via the industrial device is complete. If no, the methodology 1100 proceeds to 1116. At 1116, an execution time lapse for task expiration is verified. At 1118, it is determined whether the execution time lapse is associated with nominal delay. For example, it can be verified that execution of the command data is within a defined range from a defined task expiration time value for the execution of the command data. If yes, the methodology 1100 returns to 1112. If no, the methodology 1100 proceeds to 1120. At 1120, an alert is generated and the methodology 1100 ends. For example, the alert can be an alert that is transmitted to the cloud platform to inform the cloud platform that an amount of time for executing the command data did not satisfy a defined delay value.

FIG. 12 illustrates an example methodology 1200 for validating command data received from a cloud platform system. At 1202, industrial data associated with an industrial device is transmitted, by a cloud agent device, to a cloud platform system. The industrial data can be transmitted to the cloud agent device via first communication channel. At 1204, command data for the industrial device is received by the cloud agent device. Furthermore, the command data is received from the cloud platform system. The command data can be received from the cloud platform via a second communication channel. The command data can include a set point parameters, a set of operating commands, a set of open/close commands, a set of operating parameter values and/or other command data for the industrial device. At 1206, the command data received from the cloud platform system is validated, by the cloud agent device, based on execution data indicative of a set of security criteria for the command data. The execution data can be encrypted data stored by cloud agent device. At 1208, a communication channel with the industrial device is established, by the cloud agent device, in response to a determination that the command data satisfies the set of security criteria for the command data. The communication channel can be a third communication that is not in communication with the cloud platform system. At 1210, execution of the command data on the industrial device is initiated by the cloud agent device. For example, the command data can be provided to the industrial device and/or executed by a controller of the industrial device.

FIG. 13 illustrates an example methodology 1300 for determining and/or executing command data for an industrial device. In an aspect, methodology 1300 can be associated with cloud platform 102, cloud platform 216 and/or cloud-based industrial control system 302. Initially, at 1302, data sets are prepared based on collected time-series industrial data of an industrial system. For example, data sets can be prepared based on industrial data associated with one or more industrial devices. At 1304, operational rules are applied. Operational rules can include, for example, user-defined restrictions, requirements on operation of one or more of the industrial devices, etc. At 1306, initial conditions are set. The initial conditions can include load data (e.g., fixed load data), capacity data associated with a particular industrial device, system efficiency data, system performance data, power consumption data (e.g., fixed power consumption data), cost data (e.g., fixed cost data) and/or other data. At 1308, parameter values for one or more industrial devices in the industrial system are adjusted based on at least a calculated system efficiency and/or a performance metric determined for an operating scenario represented by the initial conditions.

At 1310, a determination is made regarding whether the calculated system efficiency and/or the calculated performance metric represents maximum system efficiency and/or maximum performance. If the system efficiency and/or system performance is not determined to represent maximum system efficiency and/or system performance, the methodology 1300 returns to 1308. Steps 1308 and 1310 are reiterated until a maximum system efficiency and/or maximum system performance is determined at 1310. For example, if the system efficiency and/or system performance is determined to represent maximum system efficiency and/or system performance, the methodology 1300 proceeds to 1312. At 1312, command data for the one or more industrial devices is generated. The command data can be associated with the parameter values. At 1314, a command validation process with a remote cloud agent associated with the one or more industrial devices is initiated. For example, a request can be transmitted to the remote cloud agent to execute the command data via the one or more industrial devices. Additionally or alternatively, the command data can be transmitted to the remote cloud agent to allow the remote cloud agent to validate the command data.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
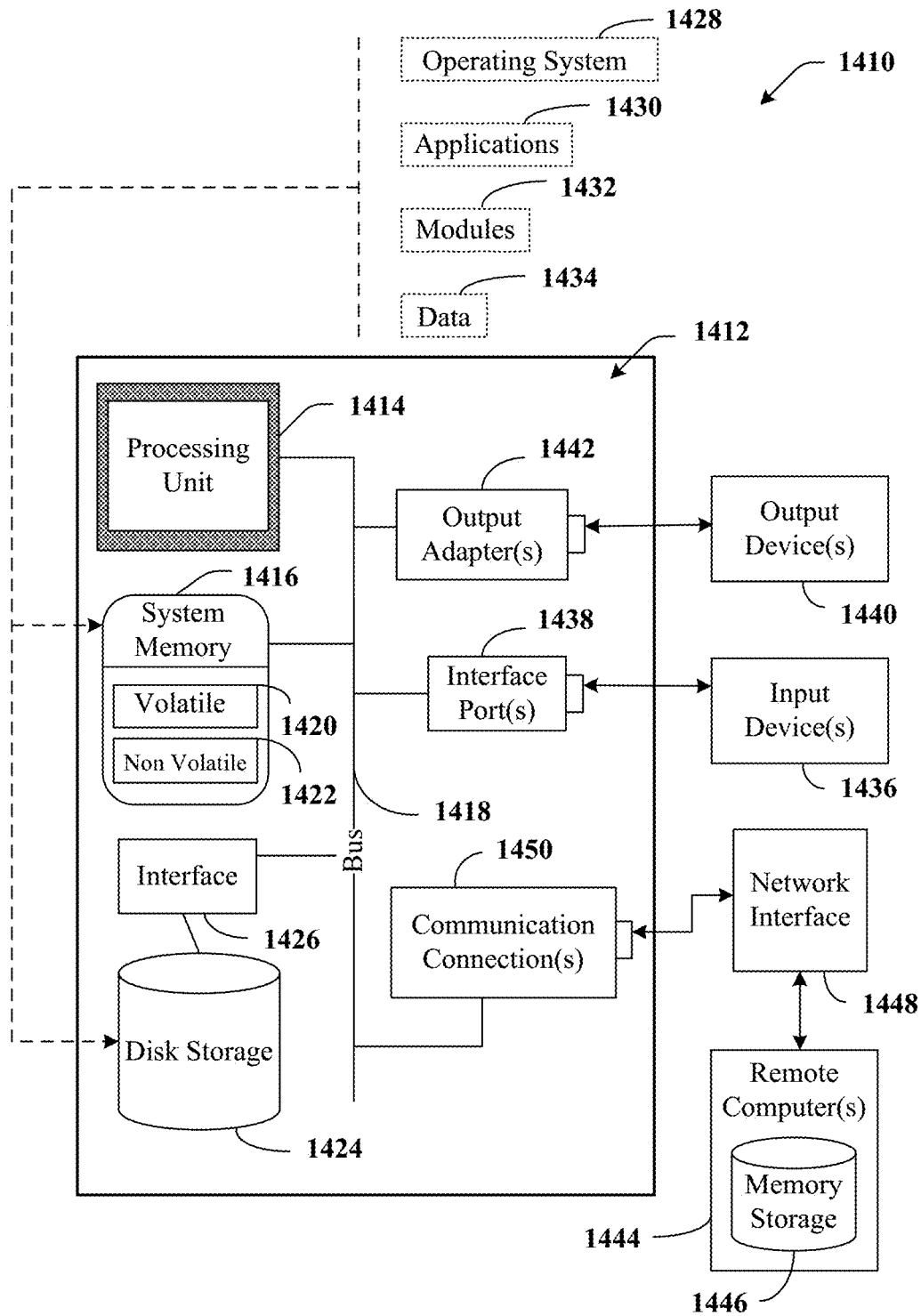
FIG. 14 is an example computing environment.
Figure 15:
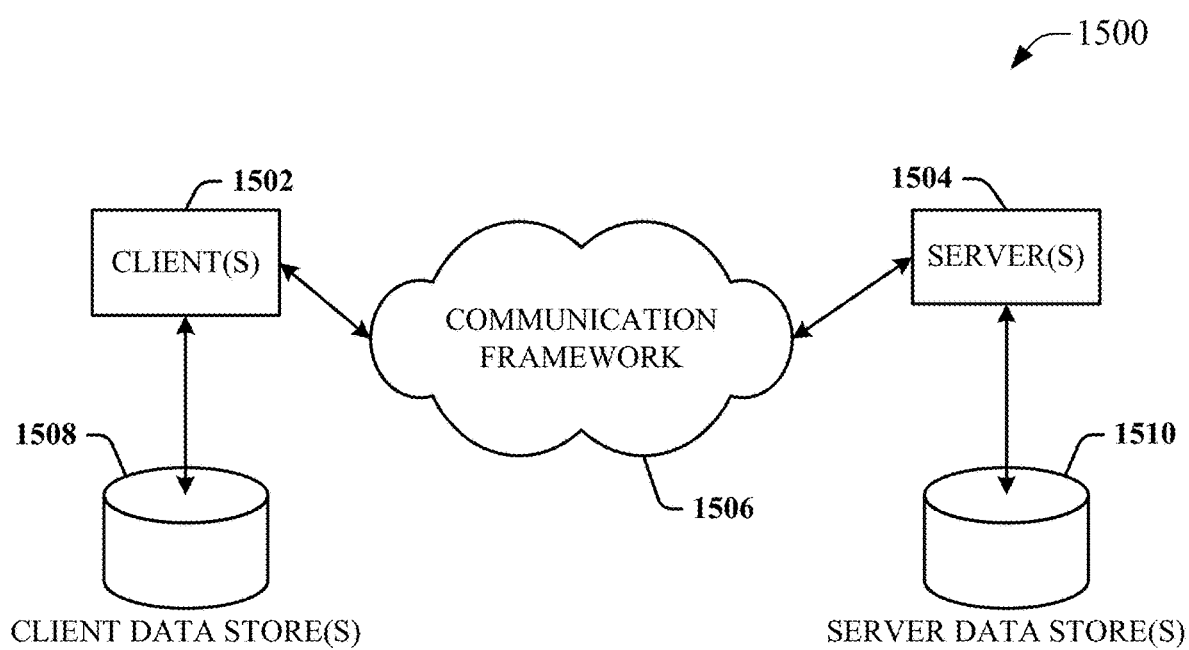
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 2246 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores computer-executable components;
a processor, operatively coupled to the memory, that executes the computer-executable components, the computer-executable components comprising:
an interface component configured to transmit, over a communication link, industrial data associated with an industrial device to a cloud service system that analyzes the industrial data, and to receive, from the cloud service system, command data for the industrial device, wherein the cloud service system is remotely located from the system and generates the command data to implement a control action determined, based on analysis of the industrial data and a behavioral model, to satisfy a defined optimization criterion;
a validation component configured to:
obtain a security manifest from the industrial device, the security manifest defining security validation requirements associated with maintaining an operating condition of the industrial device within defined operating limits with respect to execution of an industrial process associated with the industrial device, validate whether the command data received from the cloud service system satisfies the security validation requirements, transmit, based on a notification route indicated by the security manifest, an alert message to the cloud service system in response to a first determination that the command data does not satisfy the security validation requirements, and establish a secure communication link between the system and the industrial device for communication of the command data in response to a second determination that the command data satisfies the security validation requirements, wherein the secure communication link is distinct from the communication link and is encrypted; and an execution component configured to, in response to the second determination that the command data satisfies the security validation requirements, transmit the command data to the industrial device via the secure communication link, and initiate execution of the command data via the industrial device.

2. The system of claim 1, wherein the interface component is configured to receive a request from the cloud service system to execute the command data via the industrial device.

3. The system of claim 1, wherein the security validation requirements are encrypted.

4. The system of claim 1, wherein the secure communication link is a first secure communication link, and wherein the validation component is configured to transmit the alert message to the cloud service system via a second secure communication link between the system and the cloud service system.

5. The system of claim 1, wherein the alert message is a first alert message, and wherein the validation component is further configured to transmit a second alert message to the cloud service system in response to a third determination that an execution process associated with the execution of the command data via the industrial device satisfies a defined criterion.

6. The system of claim 1, wherein the execution component is further configured to determine a processing role for the execution of the command data based on context data retained by an industrial system associated with the industrial device that is located remotely from the cloud service system.

7. The system of claim 1, wherein the execution component is further configured to determine whether an interval of time for the execution of the command data exceeds a defined threshold level.

8. The system of claim 7, wherein the alert message is a first alert message, and wherein the execution component is further configured to transmit a second alert message to the cloud service system in response to a third determination that the interval of time exceeds the defined threshold level.

9. The system of claim 1, wherein the behavioral model is generated based on the industrial data.

10. A method, comprising:

transmitting, by a cloud agent device comprising a processor, industrial data associated with an industrial device to a cloud platform system over a first communication channel;

receiving, by the cloud agent device from the cloud platform system, command data for the industrial device, wherein the command data is generated by the cloud platform system to implement a control action determined, based on analysis of the industrial data and a behavioral model, to satisfy a defined optimization criterion;

obtaining, by the cloud agent device, a security manifest from the industrial device, wherein the security manifest comprises security validation requirements for maintaining an operating condition of the industrial device within a set of defined operating limits with respect to execution of an industrial process associated with the industrial device, validating, by the cloud agent device, whether the command data received from the cloud platform system satisfies the security validation requirements;

in response to determining that the command data does not satisfy the security validation requirements, transmitting, by the cloud agent device, an alert message to the cloud platform system via a notification route defined by the security manifest; and in response to determining that the command data satisfies the security validation requirements:

establishing, by the cloud agent device, a second communication channel between the cloud agent device and the industrial device for communication of the command data, wherein the second communication channel is distinct from the first communication channel and is encrypted, and initiating, by the cloud agent device, execution of the command data on the industrial device.

11. The method of claim 10, wherein the receiving comprises receiving a request from the cloud platform system to execute the command data via the industrial device.

12. The method of claim 10, further comprising, in response to the determining that the command data satisfies the security validation requirements, transmitting, by the cloud agent device, the command data to the industrial device via the second communication channel.

13. The method of claim 10, further comprising storing the security manifest at an industrial system associated with the cloud agent device that is located remotely from the cloud platform system.

14. The method of claim 10, wherein the transmitting the alert message comprises transmitting the alert message to the cloud platform system via a third communication channel between the cloud agent device and the cloud platform system.

15. The method of claim 10, further comprising transmitting, by the cloud agent device, a different alert message to the cloud platform system in response to determining that an execution process associated with the execution of the command data via the industrial device satisfies a defined criterion.

16. The method of claim 10, further comprising determining, by the cloud agent device, a processing role for the execution of the command data based on context data stored by an industrial system associated with the cloud agent device that is located remotely from the cloud platform system.

17. The method of claim 10, further comprising monitoring, by the cloud agent device, an interval of time for the execution of the command data on the industrial device.

18. A non-transitory computer-readable medium having stored thereon instructions that, in response to execution, cause a system comprising a processor to perform operations, the operations comprising:

sending industrial data associated with an industrial device to a cloud platform system located remotely from the industrial device;

receiving, from the cloud platform system, command data directed to the industrial device, wherein the command data is generated by the cloud platform system data to implement a control action determined, based on analysis of the industrial data and a behavioral model, to satisfy a defined optimization criterion;

retrieving, from the industrial device, a security manifest that is customized for the industrial device, the security manifest comprising a set of security requirements associated with maintaining an operating condition of the industrial device within a set of defined operating limits with respect to execution of an industrial process associated with the industrial device, validating whether the command data received from the cloud platform system satisfies the set of security requirements;

in response to determining that the command data does not satisfy the set of security validation requirements, transmitting an alert message to the cloud platform system via a notification path specified by the security manifest; and in response to determining that the command data satisfies the set of security validation requirements:
  establishing an encrypted communication channel between the system and the industrial device for communication of the command data, and
  initiating execution of the command data on the industrial device.

19. The non-transitory computer-readable medium of claim 18, wherein the operations further comprise decrypting the set of security requirements in response to the receiving the command data.

\* \* \* \* \*